(12) United States Patent  
Ooi

(10) Patent No.: US 8,948,593 B2  
(45) Date of Patent: Feb. 3, 2015

(54) OPTICAL NETWORK INTERCONNECT DEVICE

(75) Inventor: Hiroki Ooi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 31 days.

(21) Appl. No.: 13/178,944

(22) Filed: Jul. 8, 2011

(65) Prior Publication Data

US 2012/0082454 A1 Apr. 5, 2012

(30) Foreign Application Priority Data

Sep. 30, 2010 (JP) ................................. 2010-222158

(51) Int. Cl.
*H04B 10/20* (2006.01)
*H04J 14/02* (2006.01)

(52) U.S. Cl.
CPC ......... *H04J 14/0208* (2013.01); *H04J 14/0212* (2013.01); *H04J 14/022* (2013.01)
USPC ................... 398/59; 398/83; 398/79

(58) Field of Classification Search
USPC ............. 398/140–172, 59, 79–97, 58, 62, 64; 359/484.07, 326
See application file for complete search history.

(56) References Cited

U.S. PATENT DOCUMENTS

| | | | | |
|---|---|---|---|---|
| 5,327,427 | A * | 7/1994 | Sandesara | 370/222 |
| 5,629,995 | A * | 5/1997 | Duck et al. | 385/24 |
| 5,661,720 | A * | 8/1997 | Taniguchi | 370/223 |
| 6,226,111 | B1 * | 5/2001 | Chang et al. | 398/9 |
| 6,301,046 | B1 * | 10/2001 | Tai et al. | 359/484.07 |
| 6,333,799 | B1 * | 12/2001 | Bala et al. | 398/9 |
| 6,333,816 | B1 * | 12/2001 | Chen et al. | 359/484.07 |
| 6,337,770 | B1 * | 1/2002 | Chang et al. | 359/484.07 |
| 6,348,985 | B1 * | 2/2002 | Jiang et al. | 398/82 |
| 6,411,412 | B1 * | 6/2002 | Jiang et al. | 398/59 |
| 6,449,069 | B1 * | 9/2002 | Fujita | 398/43 |
| 6,545,782 | B1 * | 4/2003 | Wang et al. | 398/79 |
| 6,646,782 | B1 * | 11/2003 | Russell et al. | 359/322 |
| 6,810,215 | B1 * | 10/2004 | Oikawa | 398/175 |
| 6,912,340 | B2 * | 6/2005 | Bacque | 385/24 |
| 6,917,760 | B2 * | 7/2005 | Li et al. | 398/82 |
| 7,003,227 | B2 * | 2/2006 | Kim et al. | 398/82 |
| 7,054,264 | B2 * | 5/2006 | Mor | 370/223 |

(Continued)

FOREIGN PATENT DOCUMENTS

JP 2001-036479 A 2/2001
JP 2004-297228 A 10/2004

(Continued)

OTHER PUBLICATIONS

Japanese Office Action mailed on Feb. 25, 2014 issued in corresponding Japanese application No. 2010-222158, with English Translation, 6 pages.

*Primary Examiner* — Ken Vanderpuye
*Assistant Examiner* — Dibson Sanchez
(74) *Attorney, Agent, or Firm* — Fujitsu Patent Center

(57) ABSTRACT

An optical network interconnect device interconnects a first WDM network for transmitting a WDM optical signal with first wavelength spacing and a second WDM network for transmitting a WDM optical signal with second wavelength spacing that is wider than the first wavelength spacing. The optical network interconnect device includes a filter to remove a wavelength component which is not used in the second WDM network from an WDM optical signal transferred from the first WDM network to the second WDM network.

7 Claims, 19 Drawing Sheets

(56) References Cited

U.S. PATENT DOCUMENTS

| | | | |
|---|---|---|---|
| 7,092,642 B2* | 8/2006 | Way | 398/193 |
| 7,242,861 B2* | 7/2007 | Sato et al. | 398/19 |
| 7,356,258 B1* | 4/2008 | Weverka et al. | 398/59 |
| 7,437,074 B2* | 10/2008 | Nakamura et al. | 398/82 |
| 7,480,459 B2* | 1/2009 | Nakamura et al. | 398/83 |
| 7,519,296 B2 | 4/2009 | Miura et al. | |
| 7,831,118 B2 | 11/2010 | Oikawa et al. | |
| 7,869,711 B2* | 1/2011 | Ji et al. | 398/79 |
| 7,907,844 B2* | 3/2011 | Levner et al. | 398/82 |
| 8,412,042 B2* | 4/2013 | Ghioni et al. | 398/70 |
| 2001/0007509 A1* | 7/2001 | Aso et al. | 359/326 |
| 2002/0075538 A1* | 6/2002 | Jiang et al. | 359/124 |
| 2002/0145781 A1* | 10/2002 | Spock et al. | 359/127 |
| 2002/0145782 A1* | 10/2002 | Strasser et al. | 359/127 |
| 2004/0208560 A1* | 10/2004 | Gumaste et al. | 398/59 |
| 2005/0019034 A1* | 1/2005 | Aoki et al. | 398/59 |
| 2005/0105908 A1* | 5/2005 | Oikawa | 398/85 |
| 2005/0196169 A1* | 9/2005 | Tian et al. | 398/59 |
| 2006/0013587 A1* | 1/2006 | Scott et al. | 398/83 |
| 2006/0115210 A1 | 6/2006 | Nakagawa | |
| 2006/0198636 A1* | 9/2006 | Charlet et al. | 398/83 |
| 2007/0014573 A1* | 1/2007 | Wei et al. | 398/59 |
| 2007/0172240 A1* | 7/2007 | Terai et al. | 398/83 |
| 2009/0148166 A1* | 6/2009 | Akiyama et al. | 398/83 |
| 2009/0226173 A1* | 9/2009 | Yano et al. | 398/85 |
| 2010/0129076 A1* | 5/2010 | Barbarossa | 398/48 |
| 2012/0183292 A1* | 7/2012 | Boduch | 398/48 |

FOREIGN PATENT DOCUMENTS

| | | |
|---|---|---|
| JP | 2006-086920 | 3/2006 |
| JP | 2006-157590 A | 6/2006 |
| WO | WO-2005-096534 A | 10/2005 |

* cited by examiner

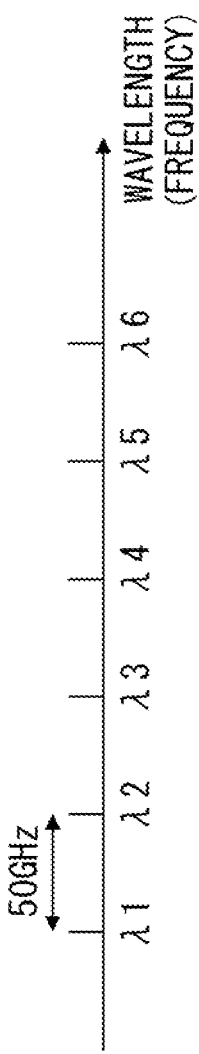
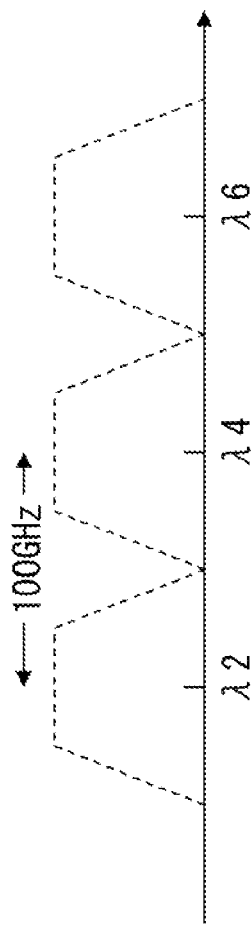
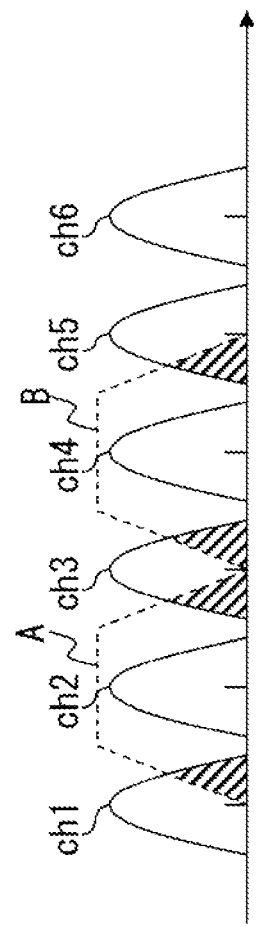
FIG. 2A
FIG. 2B
FIG. 2C

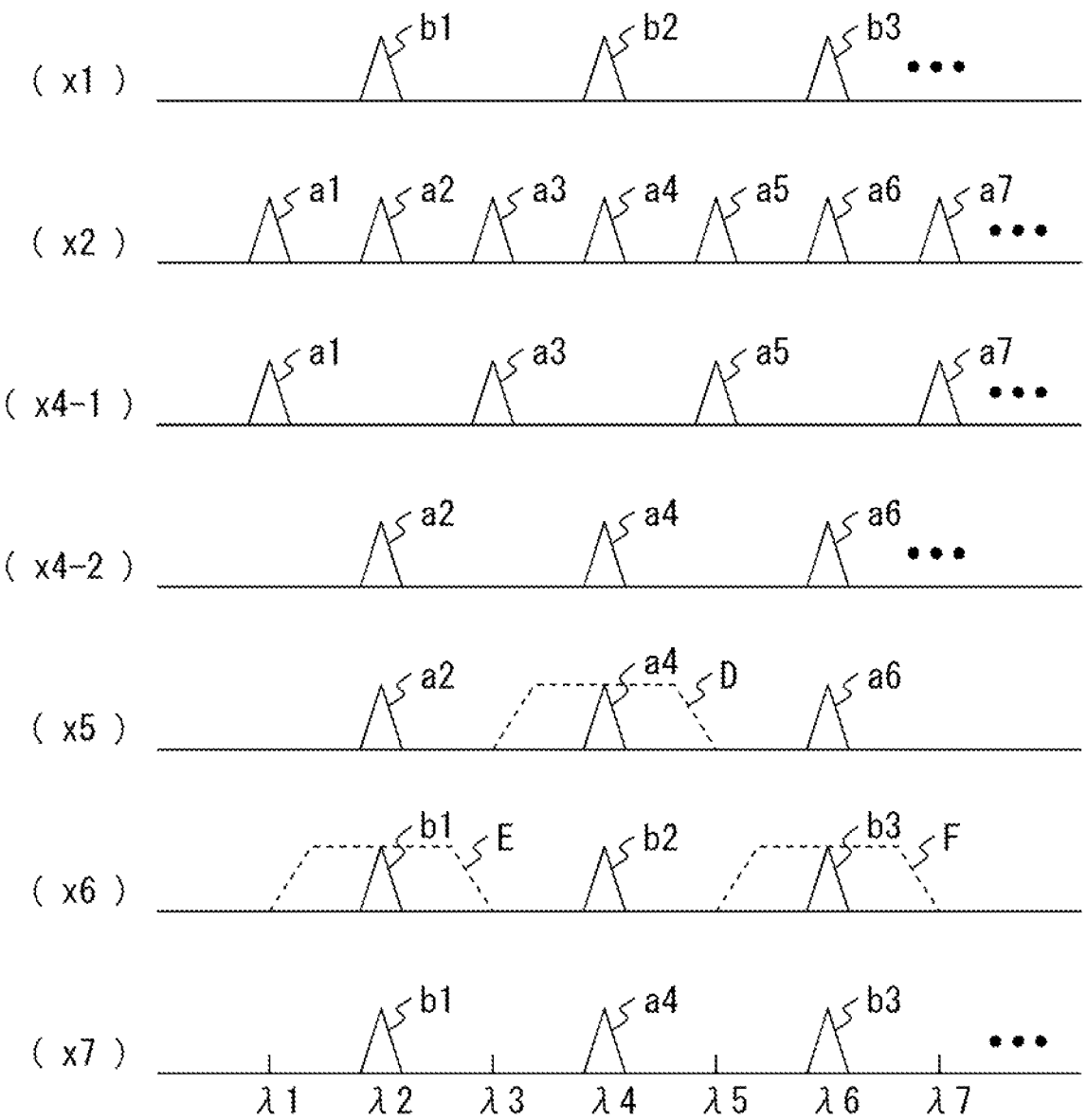
F I G. 7

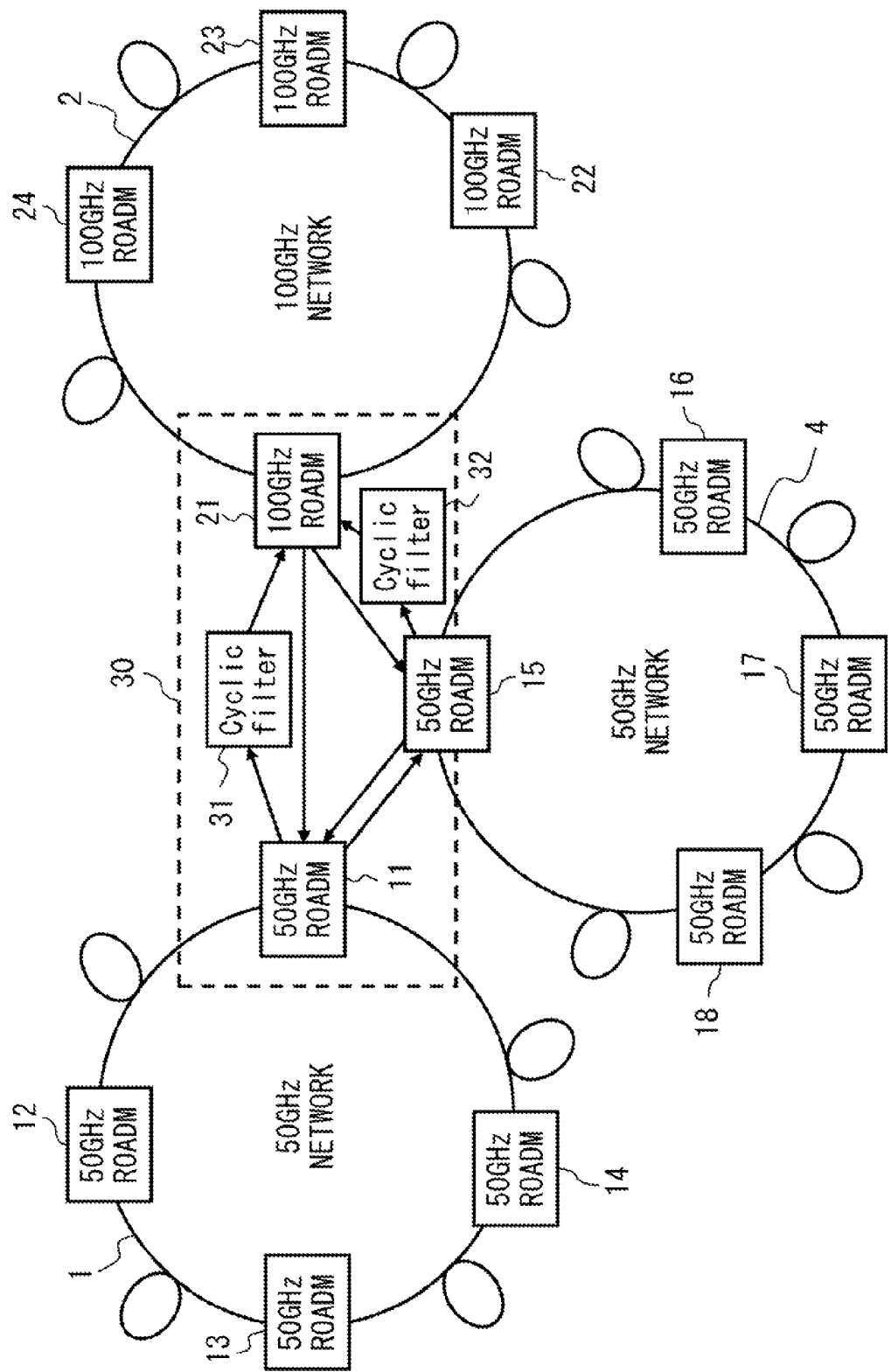
F I G. 8

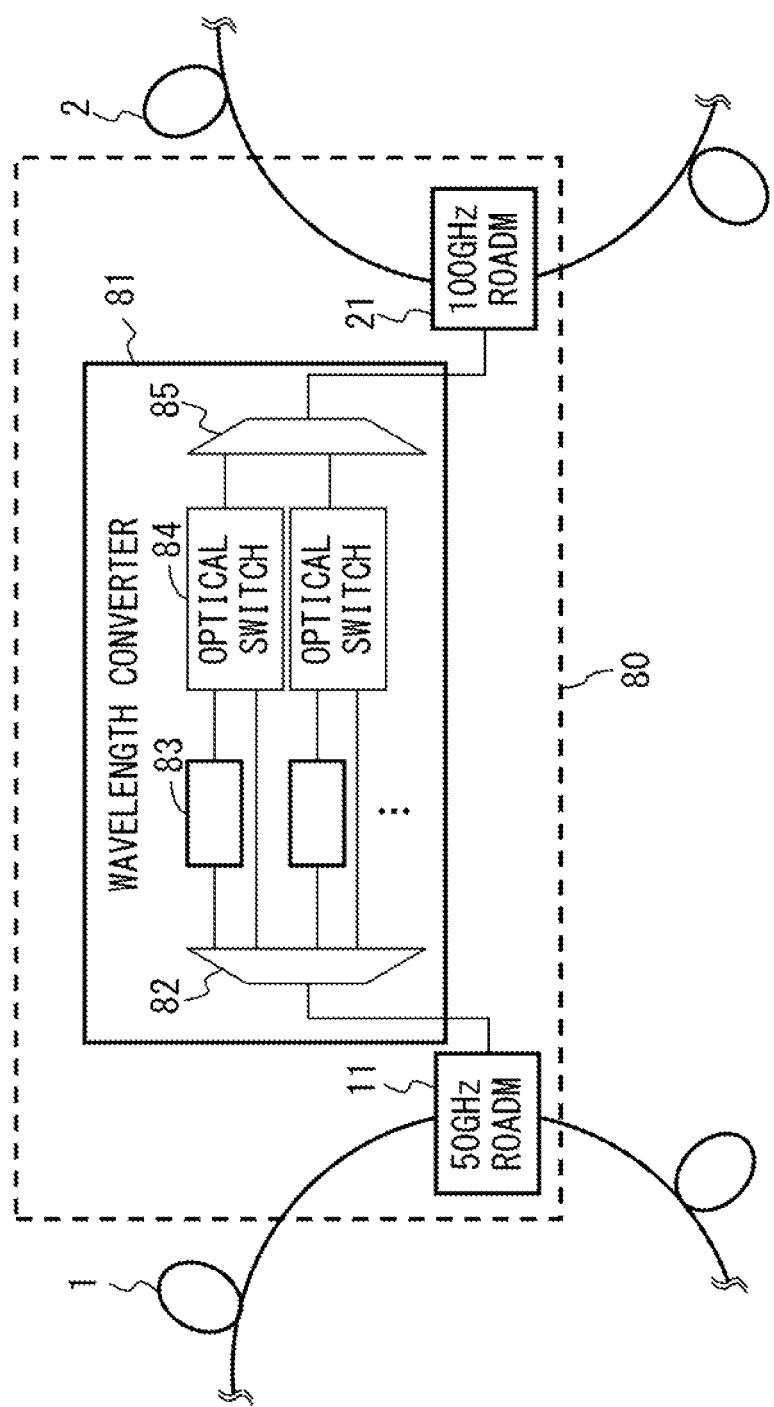
F I G. 16

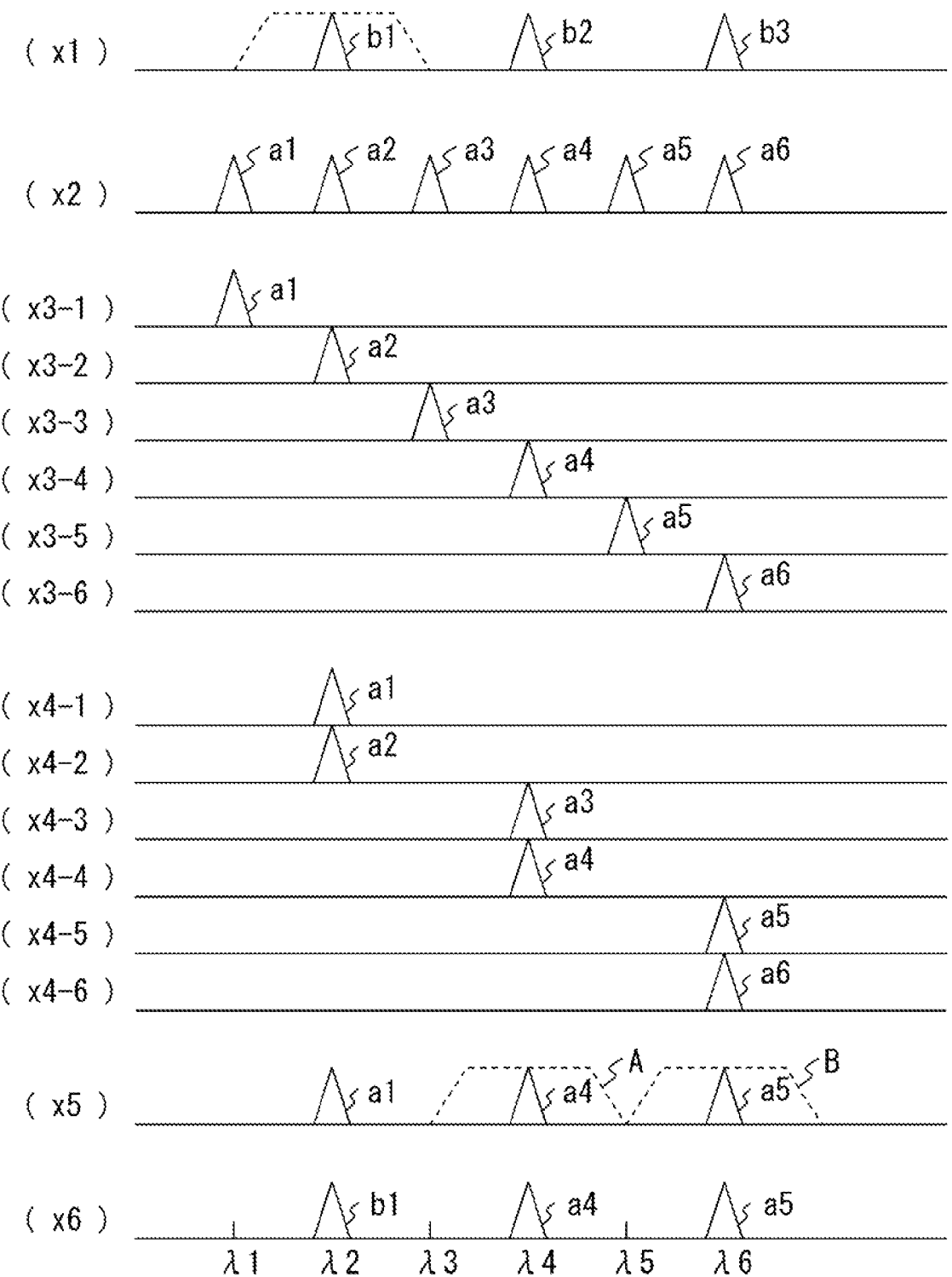
F I G. 17

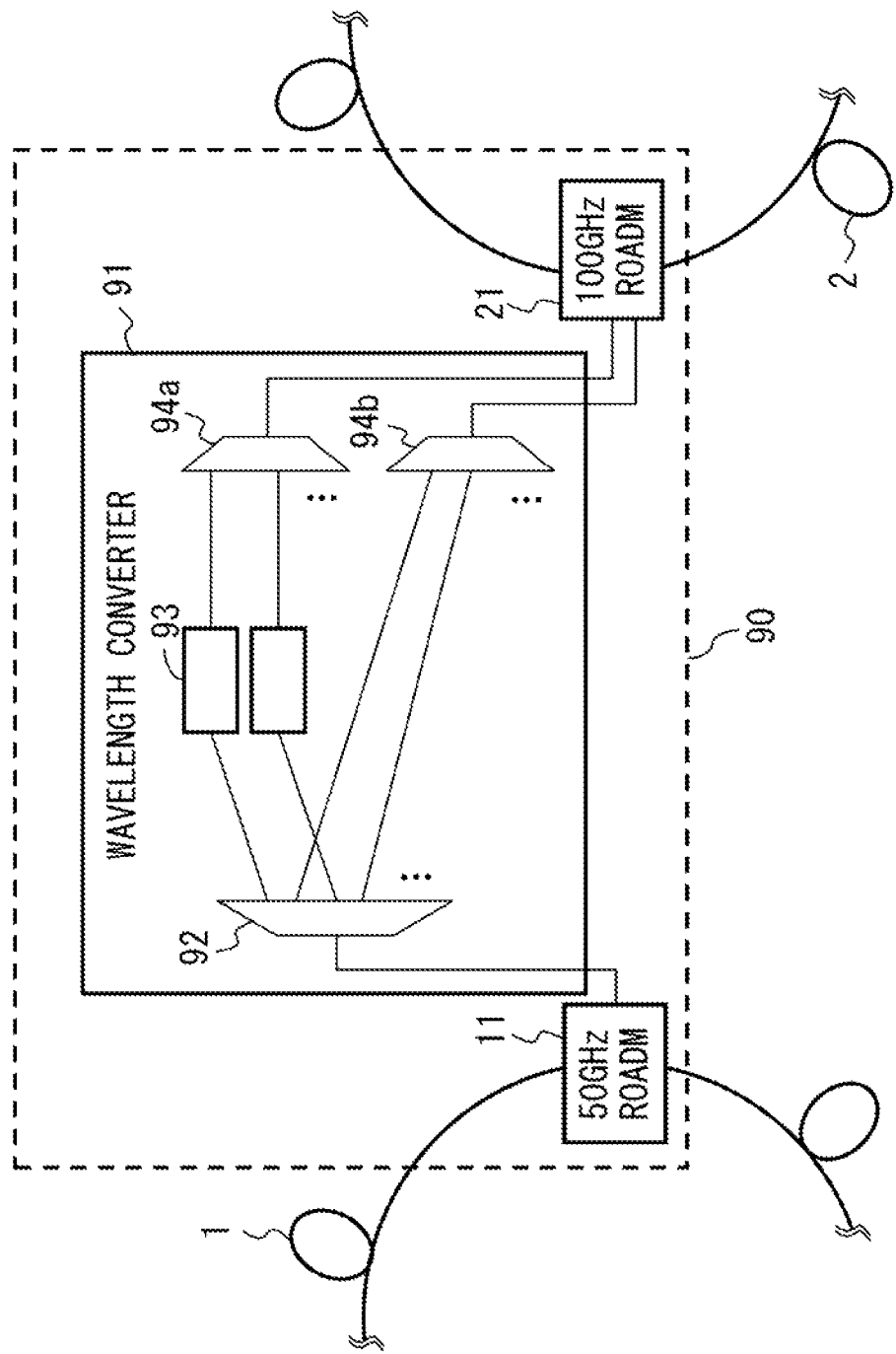
F I G. 1 8

OPTICAL NETWORK INTERCONNECT DEVICE

CROSS-REFERENCE TO RELATED APPLICATION

This application is based upon and claims the benefit of priority of the prior Japanese Patent Application No. 2010-222158, filed on Sep. 30, 2010, the entire contents of which are incorporated herein by reference.

FIELD

The embodiments discussed herein are related to an optical network interconnect device that interconnects WDM networks.

BACKGROUND

Optical ring networks, in which a plurality of nodes are connected by optical fibers to form a ring, have been put into practical use in optical network configurations. For example, a metropolitan area network (MAN) includes a plurality of optical nodes connected by optical fibers to form a ring in a city or a local area. In that configuration, each optical node is often provided with an optical add drop multiplexer (OADM). Also, a plurality of optical ring networks may sometimes be connected to each other in order to expand the communication area or to increase the communication capacity. In such a case, an optical network interconnect device is used to interconnect two or more optical ring networks. An optical network interconnect device may also be called a hub node.

Meanwhile, wavelength division multiplexing (WDM) technology is used in practice for optical communications. WDM enables large capacity communications because WDM utilizes plural wavelengths to transmit plural optical signals through an optical fiber. There is also a method under development that makes wavelength channel spacing narrower in order to further increase the transmission capacity of WDM networks. For example, in many current metropolitan area networks, the wavelength channel spacing of a WDM optical signal is 100 GHz. However, it is expected that many WDM systems will provides 50 GHz-spaced WDM channels.

Accordingly, in the foreseeable future, 100 GHz-spaced WDM networks and 50 GHz-spaced WDM networks coexist. Thus, it can be thought that there is demand for a configuration that interconnects a 100 GHz-spaced WDM network and a 50 GHz-spaced WDM network.

As a related technique, an optical network interconnect device that connects nodes of the first and second optical networks transmitting optical wavelength division multiplexed signals is proposed. An optical network interconnect device converts the signal rate and/or the optical signal wavelength of an optical signal having a particular wavelength that has been transmitted from a node of the first optical network, and adds the resultant signal to a wavelength division multiplexed signal of the second optical network. Further, this optical network interconnect device includes an photo-electric converter to perform photo-electric conversion on light transmitted from a node of the first optical network, an separator to separate an electric signal obtained by the photo-electric converter into plural electric signals, a plurality of optical modulators to optically modulate particular wavelengths of individual electric signals obtained by the separator, and an optical coupler to multiplex lights output from the plurality of optical modulators (Japanese Laid-open Patent Publication No. 2001-36479, for example).

Related techniques are also described in Japanese Laid-open Patent Publication No. 2006-86920, Japanese Laid-open Patent Publication No. 2004-297228, and International Publication Pamphlet No. WO2005/096534.

FIG. 1 illustrates an example of a configuration to connect WDM networks that with different wavelength spacing. In the example illustrated in FIG. 1, a WDM network 1 transmits 50 GHz-spaced WDM optical signal. A WDM network 2 transmits 100 GHz-spaced WDM optical signal.

The WDM network 1 has a plurality of node devices 11 through 14 connected by optical fibers to form a ring. In this example, each of the node devices 11 through 14 is a reconfigurable OADM (ROADM) to process 50 GHz-spaced WDM optical signal. The WDM network 2 has a plurality of node devices 21 through 24 connected by optical fibers to form a ring. In this example, each of the node devices 21 through 24 is a reconfigurable OADM to process 100 GHz-spaced WDM optical signal.

An optical network interconnect device (HUB node) 3 relays optical signals between the WDM network 1 and the WDM network 2. In this example, the optical network interconnect device 3 includes the node devices 11 and 21 belonging to the WDM networks 1 and 2, respectively.

In the WDM network 1, respective channels of a WDM optical signal are allocated at wavelengths $\lambda 1, \lambda 2, \lambda 3, \lambda 4 \ldots$ as illustrated in FIG. 2A. The spaces between wavelengths $\lambda 1, \lambda 2, \lambda 3, \lambda 4 \ldots$ are 50 GHz. In the WDM network 2, respective channels of a WDM optical signal are allocated at wavelengths $\lambda 2, \lambda 4, \lambda 6 \ldots$. The spaces between $\lambda 2, \lambda 4, \lambda 6 \ldots$ are 100 GHz. Each of the node devices 21 through 24 in the WDM network 2 provides transmission bands with a spacing of 100 GHz in order to transmit optical signals having wavelengths $\lambda 2, \lambda 4, \lambda 6 \ldots$ as illustrated in FIG. 2B.

Operations of transferring an optical signal of the WDM network 1 to the WDM network 2 in FIG. 1 are discussed. The optical network interconnect device 3 guides, to the node device 21, the 50 GHz-spaced WDM optical signal that is dropped by the node device 11. In this configuration, it is assumed that the node device 21 selects, for example, channels ch2 and ch4 from the WDM optical signal dropped by the node device 11, and adds the selected channels to the WDM network 2. In such a case, the node device 21 provides transmission bands A and B as illustrated in FIG. 2C. The center wavelengths of transmission bands A and B are $\lambda 2$ and $\lambda 4$, respectively. Then, optical signals in channels ch2 and ch4 are added to the WDM network 2.

However, the transmission bands provided by the respective node devices 21 through 24 of the WDM network 2 is designed to select/remove an optical channel in the 100 GHz-spaced WDM optical signal. In other words, the width of the transmission bands provided by the node devices 21 through 24 is set to be greater than that of transmission bands to select/remove an optical channel in the 50 GHz-spaced WDM optical signal. Because of this, when the 50 GHz-spaced WDM optical signal is guided from the node device 11 to the node device 21, unnecessary wavelength components enter the WDM network 2.

For example, when the node device 21 provides the transmission band A in order to select channel ch2, part of spectrums of channels ch1 and ch3 passes through the transmission band A. In such a case, signal components of channels ch1 and ch3 that pass through the transmission band A cause crosstalk with optical signal in channel ch2, deteriorating the quality of channel ch2. In a similar manner, the quality of channel ch4 is deteriorated by crosstalk caused by channels ch3 and ch5 that have passed through the transmission band B.

This problem may be solved by, for example, providing a wavelength conversion and regeneration relay device between WDM networks (i.e., between the node devices 11 and 21). In such a case, the wavelength conversion and regeneration relay device demultiplexes WDM optical signal with respect to wavelength to generate a plurality of optical signals, and converts the respective optical signals into electric signals. Next, the wavelength conversion and regeneration relay device converts the respective electric signals into optical signals having specified wavelengths. Thereafter, the wavelength conversion and regeneration relay device multiplexes the optical signals to generate a WDM optical signal. However, this configuration requires a larger sized optical network interconnect device because it has an O/E converter and an E/O converter for each wavelength. Also, such an optical network interconnect device for is expensive.

SUMMARY

According to an aspect of an invention, an optical network interconnect device that interconnects a first WDM network for transmitting a WDM optical signal with first wavelength spacing and a second WDM network for transmitting a WDM optical signal with second wavelength spacing that is wider than the first wavelength spacing, includes a filter to remove a wavelength component which is not used in the second WDM network from an WDM optical signal transferred from the first WDM network to the second WDM network.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 2A-2C explain a problem related to interconnection between WDM networks;

FIG. 7 explains operations of an optical network interconnect device that uses an interleaver as a cyclic filter;

FIG. 8 illustrates an example of a configuration in which three WDM network are connected;

FIG. 16 illustrates a configuration of an optical network interconnect device according to a fifth embodiment;

FIG. 17 explains operations of the optical network interconnect device according to the fifth embodiment;

FIG. 18 illustrates a configuration of an optical network interconnect device according to a sixth embodiment.

DESCRIPTION OF EMBODIMENTS

Figure 1:
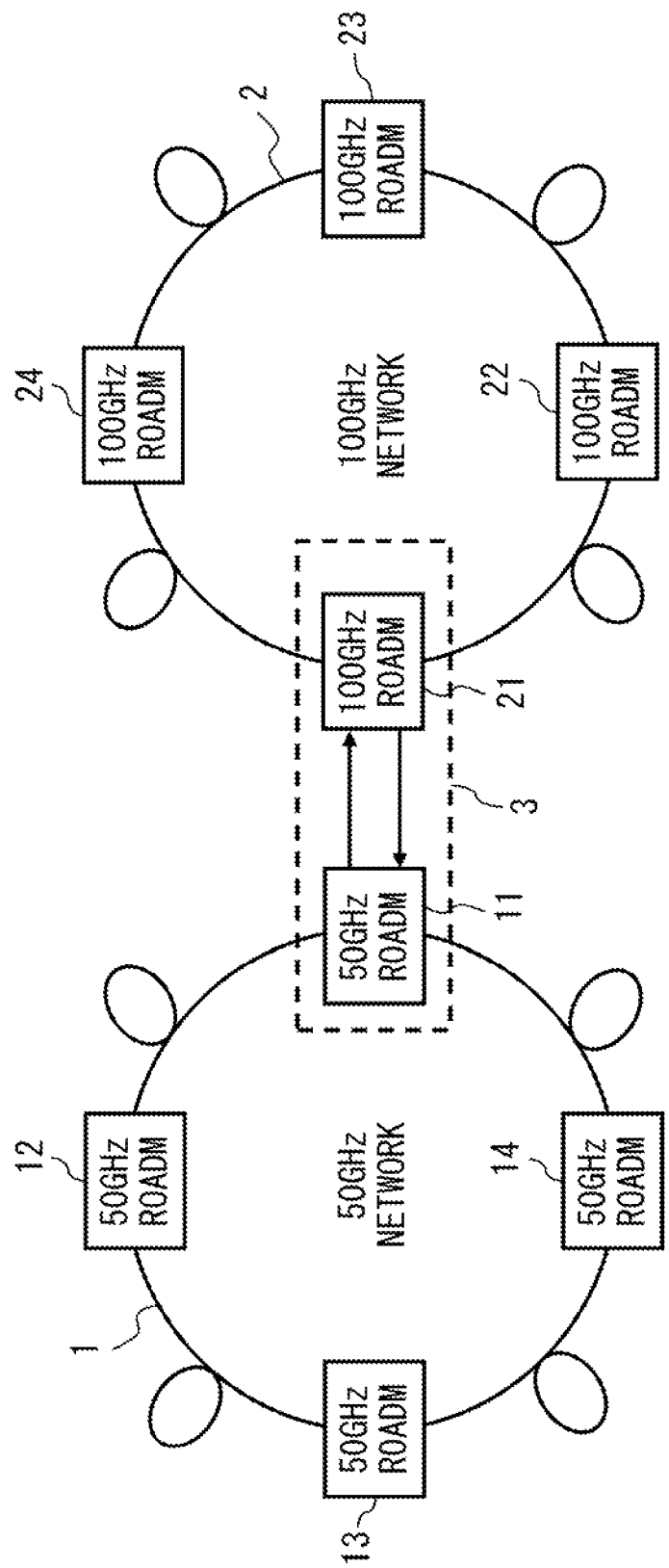
FIG. 1 illustrates an example of a configuration of interconnecting WDM networks.

Hereinafter, an optical network interconnect device according to an embodiment will be explained by referring to the drawings. In the explanations below, an optical network interconnect device interconnects the WDM network 1 and the WDM network 2 illustrated in FIG. 1.

The WDM network 1 transmits 50 GHz-spaced WDM optical signal. The WDM network 2 transmits 100 GHz-spaced WDM optical signal. The WDM network 1 includes a plurality of node devices 11 through 14 connected by optical fibers to form a ring. Each of the node devices 11 through 14 is a reconfigurable optical add drop multiplexer (ROADM) to process 50 GHz-spaced WDM optical signal. Similarly, the WDM network 2 includes a plurality of node devices 21 through 24 connected by optical fibers to form a ring. Each of the node devices 21 through 24 is a reconfigurable optical add drop multiplexer to process 100 GHz-spaced WDM optical signal. 50 GHz corresponds to about 0.4 nm if converted into wavelength.

First Embodiment

Figure 3:
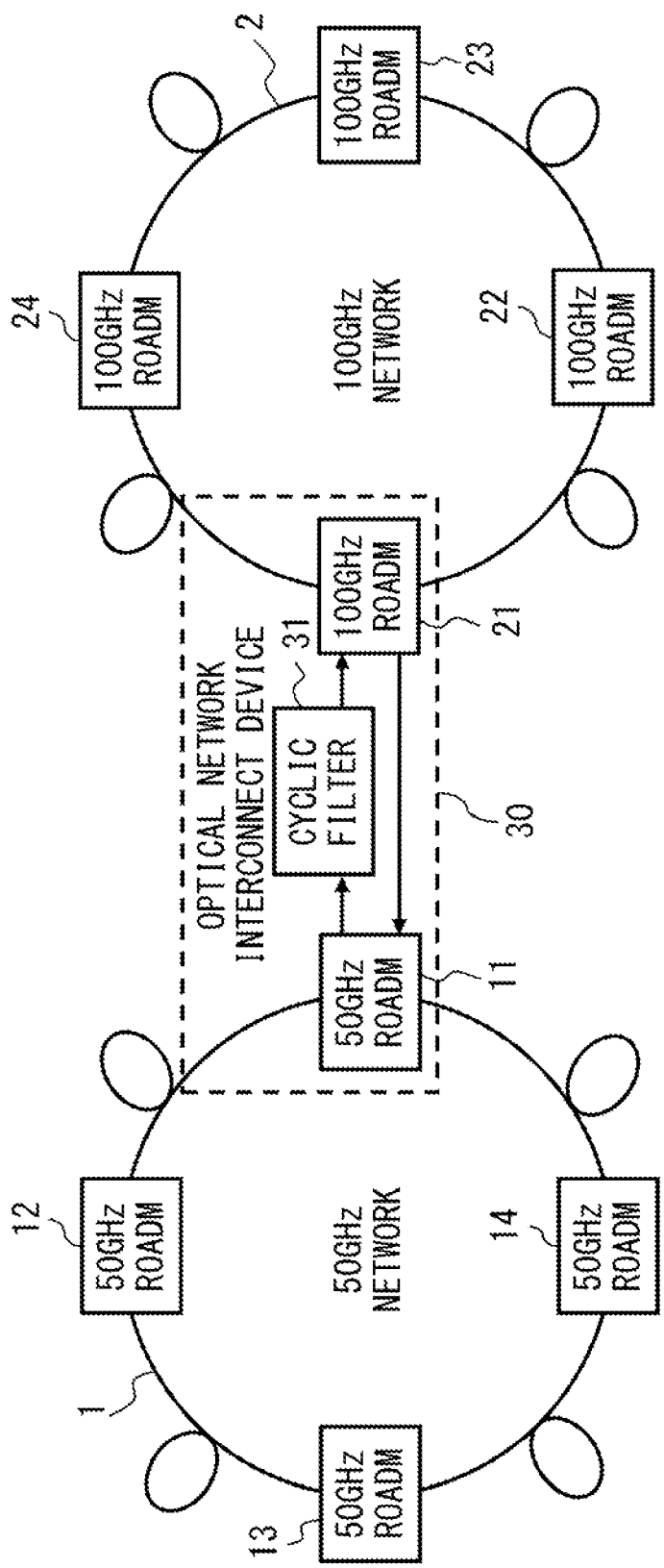
FIG. 3 illustrates a configuration of a network that uses an optical network interconnect device according to a first embodiment.

FIG. 3 illustrates a configuration of a network that uses an optical network interconnect device according to a first embodiment. An optical network interconnect device (HUB node) 30 according the first embodiment relays optical signals between the WDM network 1 and the WDM network 2. Specifically, the optical network interconnect device 30 transfers a WDM optical signal of the WDM network 1 to the WDM network 2, and transfers a WDM optical signal of the WDM network 2 to the WDM network 1. The optical network interconnect device 30 includes the node device 11 and the node device 21 belonging to the WDM networks 1 and 2, respectively, and a cyclic filter 31.

The node device 11 transmits a WDM optical signal on the WDM network 1. Hereinafter, a WDM optical signal transmitted on the WDM network 1 is also referred to as WDM optical signal #1. Specifically, the node device 11, for example, receives the WDM optical signal #1 from the node device 12 and transmits the WDM optical signal #1 to the node device 14 on the WDM network 1. The node device 11 branches the WDM optical signal #1 of the WDM network 1 to generate a branched WDM optical signal. Then, the optical network interconnect device 30 transfers the branched WDM optical signal generated from the WDM optical signal #1 to the WDM network 2. Accordingly, in the explanations below, the branched WDM optical signal generated by the node device 11 from the WDM optical signal #1 is also referred to as "internetwork WDM optical signal (1,2)". The node device 11 guides the internetwork WDM optical signal (1,2) to the cyclic filter 31.

The cyclic filter 31 removes, from the internetwork WDM optical signal (1,2), wavelength components unnecessary to the WDM network 2. The internetwork WDM optical signal (1,2) that has been filtered by the cyclic filter 31 is guided to the node device 21.

The node device 21 transmits a WDM optical signal on the WDM network 2. Hereinafter, a WDM optical signal transmitted on the WDM network 2 is also referred to as WDM optical signal #2. Specifically, the node device 21, for example, receives the WDM optical signal #2 from the node device 22 and transmits the WDM optical signal #2 to the node device 24 on the WDM network 2. The node device 21 adds, to the WDM optical signal #2 of the WDM network 2, at least one channel of the filtered internetwork WDM optical signal (1,2) output from the cyclic filter 31. Further, the node device 21 branches the WDM optical signal #2 of the WDM network 2 to generate a branched WDM optical signal. The optical network interconnect device 30 transfers the branched WDM optical signal generated from WDM optical signal #2 to the WDM network 1. Accordingly, in the explanations below, the branched WDM optical signal generated by the node device 21 from WDM optical signal #2 is also referred to as "internetwork WDM optical signal (2,1)". The node device 21 guides the internetwork WDM optical signal (2,1) to the node device 11. Further, at least one channel of the internetwork WDM optical signal (2,1) is added, by the node device 11, to the WDM optical signal #1 of the WDM network 1.

As described above, the optical network interconnect device 30 uses the cyclic filter 31 to perform filtering on an internetwork WDM optical signal being transferred from a WDM network (the WDM network 1 in FIG. 3) that transmits narrow-spaced WDM optical signal to a WDM network (the WDM network 2 in FIG. 3) that transmits wider-spaced WDM optical signal. In this configuration, the cyclic filter 31 removes, from the internetwork WDM optical signal (1,2) being guided from the WDM network 1 to the WDM network 2, wavelength components unnecessary to the WDM network 2. Thus, crosstalk caused by optical signals added from the WDM network 1 is suppressed in the WDM network 2.

Figure 4:
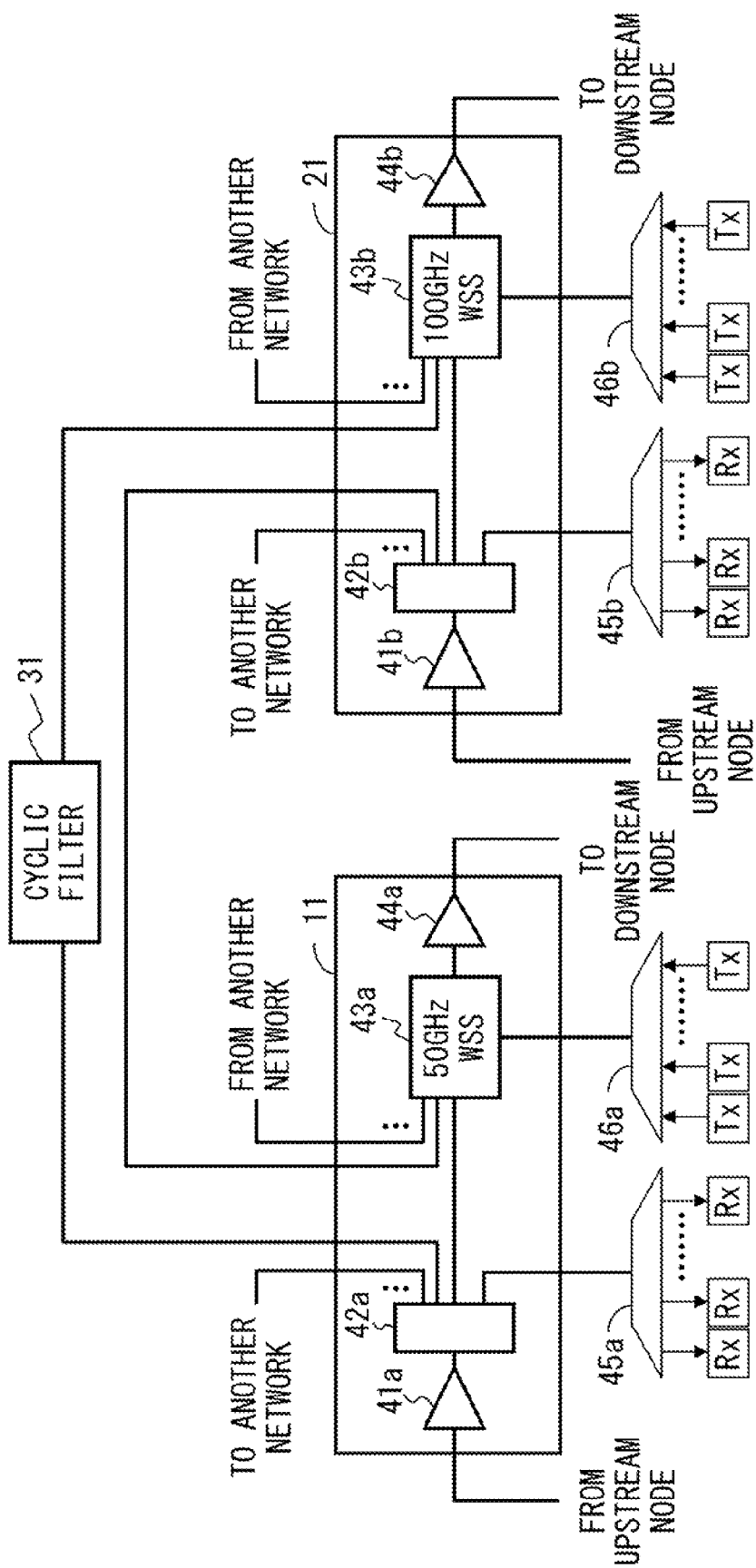
FIG. 4 illustrates a configuration of the optical network interconnect device according to the first embodiment.

FIG. 4 illustrates a configuration of the optical network interconnect device 30 according to the first embodiment. As has been described, the optical network interconnect device 30 includes the node device 11, the node device 21, and the cyclic filter 31.

The node device 11 is a reconfigurable optical add drop multiplexer (ROADM) to process 50 GHz-spaced WDM optical signal. The node device 11 includes an optical amplifier 41a, an optical splitter 42a, a wavelength selective switch (WSS) 43a, an optical amplifier 44a, an optical demultiplexer 45a, and an optical multiplexer 46a.

The optical amplifier 41a amplifies a WDM optical signal transmitted from an adjacent node device (for example, node device 12). The optical splitter 42a splits the WDM optical signal amplified by the optical amplifier 41a, and generates a through optical signal, a drop optical signal, and one or a plurality of internetwork optical signals. The optical splitter 42a is an optical power splitter. Note that the optical splitter 42a is an example of an optical branch device.

The through optical signal is a WDM optical signal transmitted to an adjacent node device (for example, the node device 14), and is guided to the wavelength selective switch 43a. The drop optical signal is guided to the optical demultiplexer 45a. Respective internetwork optical signals are transferred to other WDM networks that are connected to the WDM network 1. In the example illustrated in FIG. 4, the internetwork optical signal transferred to the WDM network 2 is guided to the cyclic filter 31.

The through optical signal, an add optical signal, one or a plurality of internetwork optical signals are input into the wavelength selective switch 43a from the optical splitter 42a, the optical multiplexer 46a, and other WDM networks connected to the WDM network 1, respectively. In the example illustrated in FIG. 4, the internetwork optical signal transferred from the WDM network 2 (specifically, from the node device 21) is guided to the wavelength selective switch 43a. The wavelength selective switch 43a has a function of selecting desired one or a plurality of wavelengths from respective input optical signals. The wavelength selective switch 43a is capable of selecting desired wavelengths with a spacing of 50 GHz. The wavelength selective switch 43a selects a plurality of optical signals to be transmitted to an adjacent node device (for example, the node device 14) to generate a WDM optical signal of the WDM network 1. The optical amplifier 44a amplifies the WDM optical signal output from the wavelength selective switch 43a.

The optical demultiplexer 45a demultiplexes the drop optical signal generated by the optical splitter 42a with respect to wavelength. A plurality of optical signals obtained by the optical demultiplexer 45a are transmitted to corresponding receivers Rx via drop lines, respectively. The optical multiplexer 46a multiplexes a plurality of optical signals with different wavelength transmitted from a plurality of transmitters Tx to generate an add optical signal. The add optical signal is guided to the wavelength selective switch 43a.

The configuration of the node device 21 is similar to that of the node device 11, and includes an optical amplifier 41b, an optical splitter 42b, a wavelength selective switch 43b, an optical amplifier 44b, an optical demultiplexer 45b, and an optical multiplexer 46b. However, the node device 21 is a reconfigurable optical add drop multiplexer (ROADM) that processes 100 GHz-spaced WDM optical signal. Accordingly, the wavelength selective switch 43b selects desired wavelengths with a spacing of 100 GHz. In addition, a WDM optical signal that has been filtered by the cyclic filter 31 (i.e., an internetwork optical signal transferred from the WDM network 1 to the WDM network 2) is input to the wavelength selective switch 43b. Note that the wavelength selective switch 43b is an example of an optical add device.

The cyclic filter 31 removes, from the internetwork WDM optical signal transferred from the WDM network 1 to the WDM network 2, wavelength components unnecessary to the WDM network 2. The cyclic filter 31 is implemented by, for example, an etalon filter, an interleaver, or a wavelength selective switch, which will be explained later in detail.

As described above, each node device is a reconfigurable optical add drop multiplexer in this example. Thus, the node device is capable of dropping one or a plurality of optical signals from a WDM optical signal to guide the signal(s) to a drop line(s), and is also capable of adding one or a plurality of optical signals from an add line(s) to a WDM optical signal. However, hereinbelow, descriptions about adding and dropping of optical signals are omitted so that the explanations will not become complex.

Figure 5:
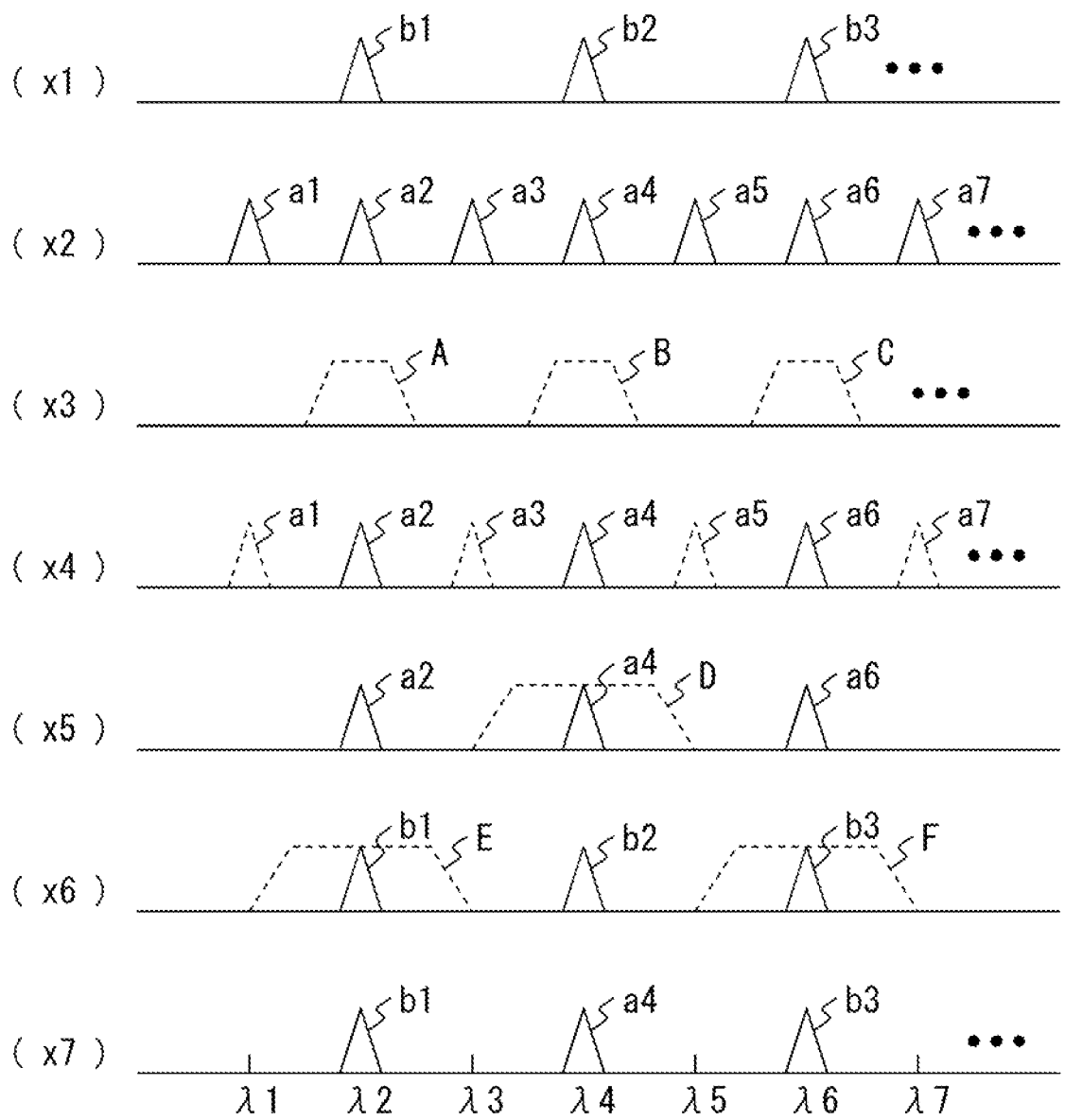
FIG. 5 illustrates operations of the optical network interconnect device according to the first embodiment.

FIG. 5 illustrates operations of the optical network interconnect device 30 according to the first embodiment. In the example illustrated in FIG. 5, a WDM optical signal of the WDM network 2 contains optical signals b1, b2, and b3 as indicated by (x1). The wavelengths of optical signals b1, b2, and b3 are $\lambda 2$, $\lambda 4$, and $\lambda 6$, respectively. The spacing of a WDM optical signal of the WDM network 2 is 100 GHz. In this example, respective optical signals contained in a WDM optical signal of the WDM network 2 are allocated on ITU-T 100 GHz grid. A WDM optical signal of the WDM network 1 contains optical signals a1 through a7 as indicated by (x2). The wavelengths of optical signals a1 through a7 are $\lambda 1$ through $\lambda 7$, respectively. The wavelength spacing of a WDM optical signal of the WDM network 1 is 50 GHz. Respective optical signals contained in a WDM optical signal of the WDM network 1 are allocated on ITU-T 50 GHz grid. It is assumed in FIG. 5 that the optical network interconnect device 30 adds, to a WDM optical signal of the WDM network 2, optical signal a4 in a WDM optical signal of the WDM network 1.

The cyclic filter 31 is, for example, an etalon filter. An etalon filter used as the cyclic filter 31 provides transmission bands with a spacing of 100 GHz. In the example illustrated in FIG. 5, the cyclic filter 31 provides transmission bands A, B, C, . . . as indicated by (x3). The center wavelengths of transmission bands A, B, and C are $\lambda 2$, $\lambda 4$, and $\lambda 6$, respectively. In other words, transmission bands provided by the cyclic filter 31 transmit wavelengths on the wavelength grids of the WDM network 2, and remove other wavelengths (wavelength components unnecessary to the WDM network 2). The cyclic filter 31 is not limited to an etalon filter, and an optical filter that selects/removes wavelength components with a spacing of 100 GHz can be used as the cyclic filter 31.

The optical network interconnect device 30 branches a WDM optical signal of the WDM network 1, and guides the branched WDM optical signal to the cyclic filter 31. In other words, an internetwork WDM optical signal containing optical signals a1 through a7 is input to the cyclic filter 31. In this configuration, the cyclic filter 31 provides transmission bands A, B, and C as described above. Accordingly, optical signals a2, a4, and a6 pass through the cyclic filter 31, while optical signals a1, a3, a5, and a7 are removed by the cyclic filter 31 as indicated by (x4).

The width of each of the respective transmission bands provided by the cyclic filter 31 is designed to be able to sufficiently remove the optical signals next to the target optical signal on the 50 GHz grid. In other words, the width of the transmission bands provided by the cyclic filter 31 is desirably designed to be smaller than the width corresponding to, for example, 50 GHz (i.e., about 0.4 nm). Thus, when optical signals a1 through a7 are input to the cyclic filter 31, optical signals a1, a3, a5, and a7 are removed sufficiently by the cyclic filter 31. The internetwork WDM optical signal (a2, a4, a6) that has been filtered by the cyclic filter 31 is guided to the wavelength selective switch 43b of the node device 21.

As indicated by (x5), the wavelength selective switch 43b provides transmission band D in order to select optical signal a4 from the internetwork WDM optical signal (a2, a4, a6) that has been filtered by the cyclic filter 31. The wavelength selective switch 43b also provides transmission bands E and F in order to select optical signals b1 and b3 from WDM optical signal (b1, b2, b3) of the WDM network 1 as indicated by (x6). The wavelength selective switch 43b outputs a WDM optical signal containing optical signals b1, a4, and b3 as indicated by (x7). As described above, the optical network interconnect device 30 transfers the WDM optical signal (a1 through a7) of the WDM network 1 to the WDM network 2, and the node device 21 adds optical signal a4 to the WDM optical signal of the WDM network 2.

The optical network interconnect device 30 transfers the WDM optical signal from the WDM network 2 to the WDM network 1 as well. However, the wavelength channel spacing of a WDM optical signal of the WDM network 2 is wider than the wavelength channel spacing of a WDM optical signal of the WDM network 1. Accordingly, an internetwork WDM optical signal to be transferred from the WDM network 2 to the WDM network 1 is guided to the wavelength selective switch 43a of the node device 11 without passing through the cyclic filter 31. The operations of the wavelength selective switch 43a selecting a desired wavelength are similar to those of the wavelength selective switch 43b.

Figure 6:
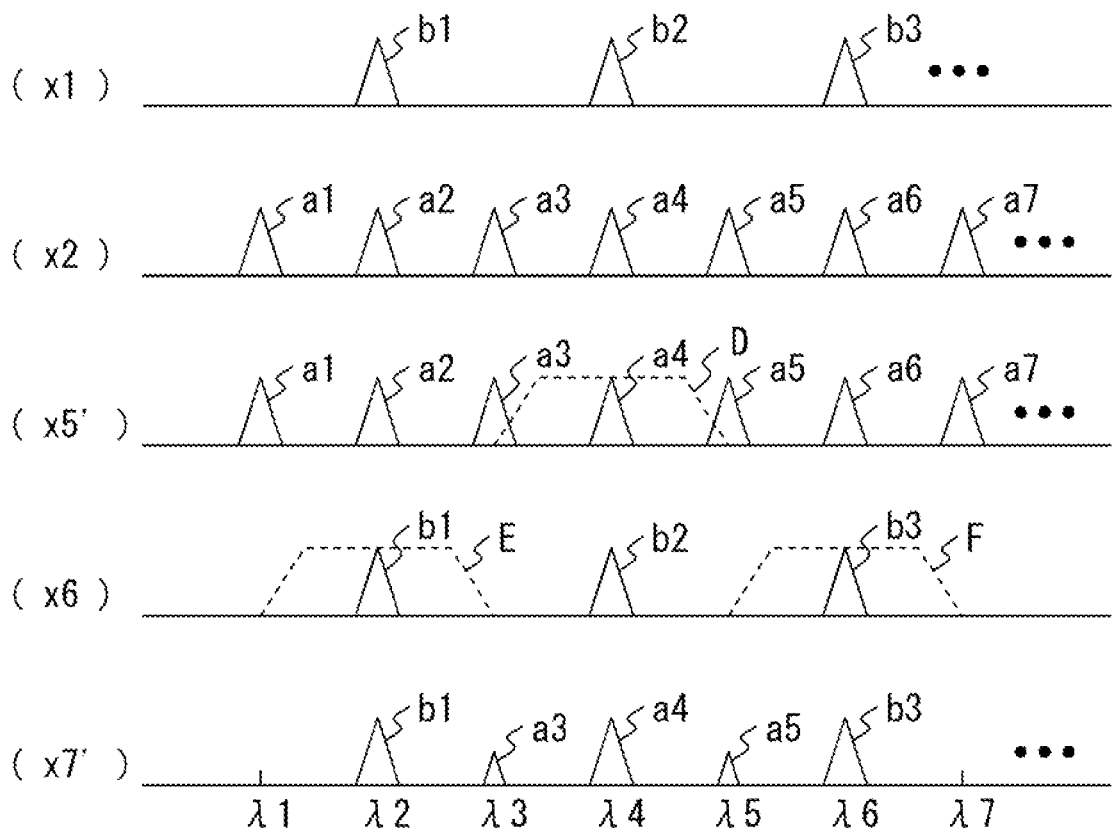
FIG. 6 explains effects by the first embodiment.

FIG. 6 explains effects attained by the first embodiment. FIG. 6 illustrates relaying of a WDM optical signal performed by an optical network interconnect device that does not include the cyclic filter 31. In the example illustrated in FIG. 6, the optical network interconnect device adds, to a WDM optical signal of the WDM network 2, optical signal a4 in an WDM optical signal of the WDM network 1, similar to the example of FIG. 5.

In an optical network interconnect device as described above, an internetwork WDM optical signal containing optical signals a1 through a7 is input to the wavelength selective switch 43b as indicated by (x5'). In other words, in a configuration without the cyclic filter 31, optical signals a1, a3, a5, and a7 are also input to the wavelength selective switch 43b.

Similarly to the example illustrated in FIG. 5, the wavelength selective switch 43b provides transmission band D. However, transmission band D is designed to select/remove optical signals for 100 GHz-spaced WDM optical signal. Accordingly, not only optical signal a4 but also part of components of optical signals a3 and a5 passes through transmission band D. As a result of this, a WDM optical signal output from the wavelength selective switch 43b contains residual components of optical signals a3 and a5 as indicated by (x7'). In other words, on the WDM network 2, optical signals b1, a4, and b3 are influenced by crosstalk caused by the residual components of optical signals a3 and a5.

By contrast, in the optical network interconnect device 30 according to the first embodiment, the cyclic filter 31 removes wavelength components unnecessary to the WDM network 2. Accordingly, crosstalk on the network 2 is suppressed, and the transmission quality of optical signals is enhanced.

Although the cyclic filter 31 is implemented by an etalon filter in the above example, the cyclic filter 31 may be implemented in other manners. For example, the cyclic filter 31 may also be implemented by a wavelength selective switch. In such a case, a wavelength selective switch is designed and controlled to provide a transmission band equivalent to that provided by the etalon filter illustrated in FIG. 5.

The cyclic filter 31 may also be implemented by using an interleaver. In the optical network interconnect device 30 illustrated in FIGS. 3 and 4, a 50 GHz/100 GHz interleaver is used as the cyclic filter 31. FIG. 7 illustrates operations of an optical network interconnect device performed when the cyclic filter 31 is implemented by an interleaver.

The 50 GHz/100 GHz interleaver deinterleaves 50 GHz-spaced WDM optical signal to generate a pair of 100 GHz-spaced deinterleaved WDM optical signals. In the example illustrated in FIG. 7, an interleaver deinterleaves optical signals a1 through a7 to generate optical signals a1, a3, a5, and a7 indicated by (x4-1) and optical signals a2, a4, and a6 indicated by (x4-2). As described above, the interleaver separates a WDM optical signal into odd-numbered channels and even-numbered channels.

The optical network interconnect device 30 guides, to the wavelength selective switch 43b of the node device 21, one of the pair of the WDM optical signals output from the interleaver that operates as the cyclic filter 31. At this time, the optical network interconnect device 30 guides, to the node device 21, WDM optical signal conforming to the wavelength grid of the WDM network 2. Accordingly, in the example illustrated in FIG. 7, the optical network interconnect device 30 guides, to the wavelength selective switch 43b of the node device 21, a WDM optical signal containing optical signals a2, a4, and a6 indicated by (x4-2). As a result, an optical signal, from which unnecessary wavelength components (optical signals a1, a3, a5, and a7 in this example) is removed, is guided to the wavelength selective switch 43b similarly to the example illustrated in FIG. 5. The operations of the wavelength selective switch 43b are as explained by referring to FIG. 5.

The optical network interconnect device 30 illustrated in FIGS. 3 and 4 interconnects two WDM networks. However, the optical network interconnect device 30 may interconnect three or more WDM networks.

FIG. 8 illustrates an example of a configuration in which three WDM networks are connected. In FIG. 8, the optical network interconnect device 30 interconnects WDM networks 1 and 2 and 4. The WDM networks 1 and 2 are as explained by referring to FIG. 3. The WDM network 4 includes node devices 15 through 18 connected by optical fibers to form a ring. The WDM network 4 transmits 50 GHz-spaced WDM optical signal similar to the WDM network 1.

The optical network interconnect device 30 includes the node devices 11, 21, and 15 respectively belonging to the WDM networks 1, 2, and 4, and cyclic filters 31 and 32. As has been described, the cyclic filter 31 removes wavelength components unnecessary to the WDM network 2 from an internetwork WDM optical signal guided from the WDM network 1 to the WDM network 2. Similarly, the cyclic filter 32 removes wavelength components unnecessary to the WDM network 2 from an internetwork WDM optical signal guided from the WDM network 4 to the WDM network 2.

As described above, the optical network interconnect device 30 has a cyclic filter that performs filtering on an internetwork WDM optical signal transferred from a WDM network with narrower wavelength channel spacing to a WDM network with wider wavelength channel spacing, in a case where WDM networks with different wavelength channel spacing are to be interconnected. Note that the WDM networks 1 and 4 transmit WDM signals with same wavelength channel spacing. Accordingly, the optical network interconnect device 30 does not have a cyclic filter between the WDM networks 1 and 4.

Second Embodiment

Figure 9:
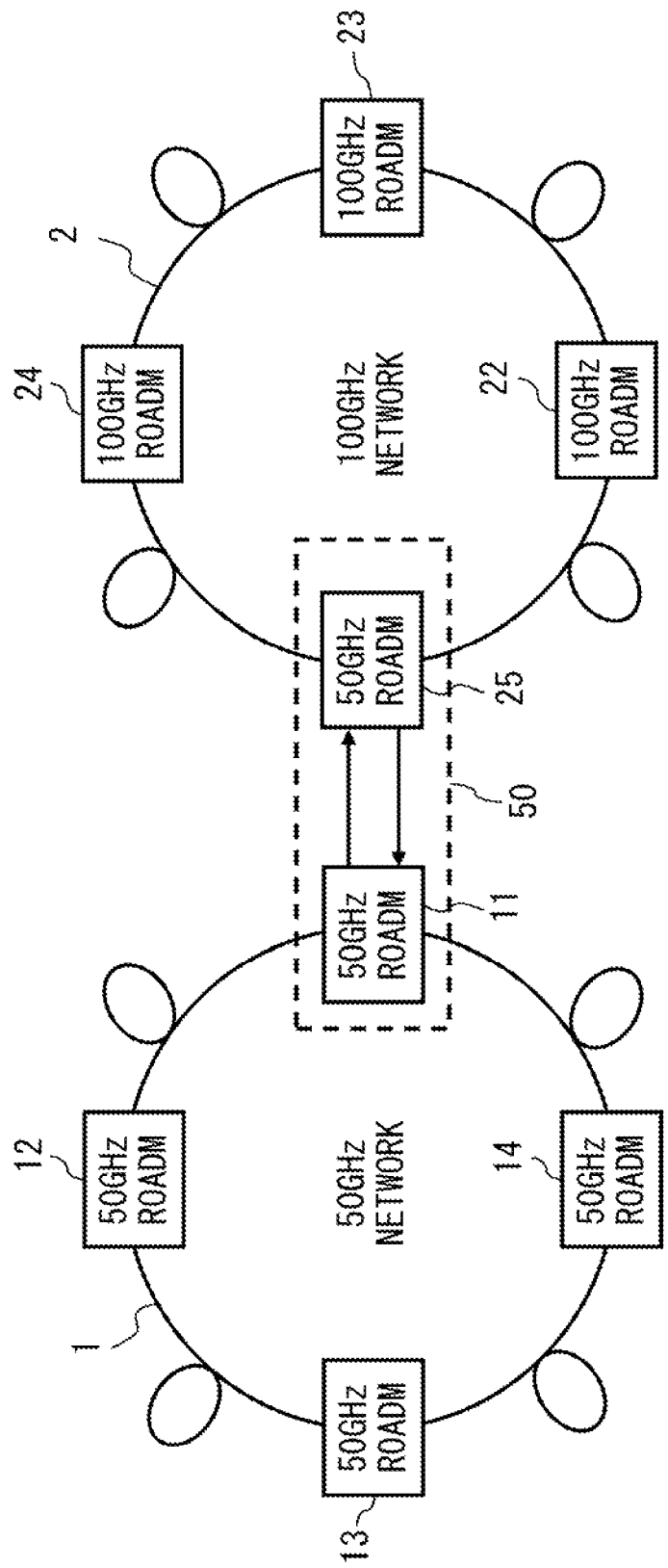
FIG. 9 illustrates a configuration of a network that uses an optical network interconnect device according to a second embodiment.

FIG. 9 illustrates a configuration of a network that uses an optical network interconnect device according to a second embodiment. An optical network interconnect device 50 according the second embodiment relays optical signals between the WDM networks 1 and 2.

As explained by referring to FIG. 3, the WDM network 1 includes the node devices 11 through 14, and transmits 50 GHz-spaced WDM optical signal. The WDM network 2 transmits 100 GHz-spaced WDM optical signal. However, in the example illustrated in FIG. 9, the WDM network 2 includes the node devices 22 through 25.

The optical network interconnect device 50 includes the node devices 11 and 25 belonging to the WDM networks 1 and 2, respectively. In this configuration, the node device 25 belongs to the WDM network 2, which transmits 100 GHz-spaced WDM optical signal, but is implemented by a reconfigurable optical add drop multiplexer (ROADM) that processes 50 GHz-spaced WDM optical signal. The configuration and operations of the node device 25 are similar to those of the node device 21 illustrated in FIG. 4. However, a wavelength selective switch included in the node device 25 is capable of arbitrarily selecting respective wavelengths on ITU-T 50 GHz grid. In other words, the wavelength selective switch of the node device 25 provides a transmission band that is sufficiently narrow as to arbitrarily select/remove respective optical signals allocated with a spacing of 50 GHz.

Figure 10:
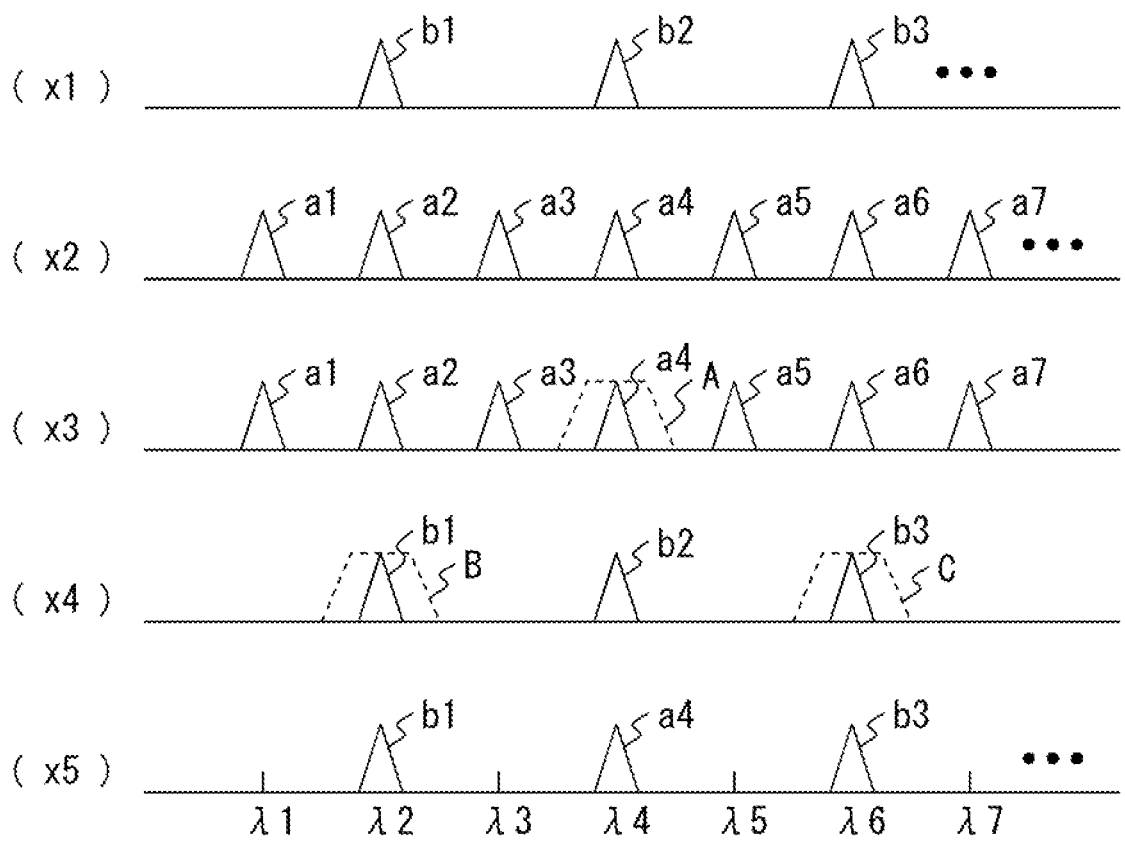
FIG. 10 explains operations of the optical network interconnect device according to the second embodiment.

FIG. 10 illustrates operations of the optical network interconnect device 50 according to the second embodiment. Also in the explanations of FIG. 10, a WDM optical signal of the WDM network 2 contains optical signals b1, b2, and b3 as indicated by (x1). A WDM optical signal of the WDM network 1 contains optical signals a1 through a7 as indicated by (x2). The optical network interconnect device 50 adds, to a WDM optical signal of the WDM network 2, optical signal a4 in a WDM optical signal of the WDM network 1.

In this case, the wavelength selective switch of the node device 25 selects optical signal a4 in the internetwork WDM optical signal (a1 through a7) branched from the WDM optical signal of the WDM network 1. The wavelength selective switch provides transmission band A as indicated by (x3). The center wavelength of transmission band A is λ4. Also, the width of transmission band A is sufficiently narrow as to arbitrarily select/remove respective optical signals allocated on the 50 GHz grid. Accordingly, the wavelength selective switch in the node device 25 is sufficiently capable of removing wavelength components other than optical signal a4 from an internetwork WDM optical signal (a1 through a7).

Similarly, the wavelength selective switch of the node device 25 selects optical signals b1 and b3 from a WDM optical signal (b1 through b3) of the WDM network 2. At this time, the wavelength selective switch provides transmission bands B and C as indicated by (x4). Thereby, the wavelength selective switch of the node device 25 removes the wavelength components of optical signals b2 from the WDM optical signal (b1 through b3) of the WDM network 2. As a result, the node device 25 outputs a WDM optical signal containing optical signals b1, a4, and b3 as indicated by (x5).

As described above, in the second embodiment, the node device 25 has a function of processing 50 GHz-spaced WDM optical signal although the node device 25 belongs to the WDM network 2 transmitting 100 GHz-spaced WDM optical signal. Accordingly, when 50 GHz-spaced WDM optical signal is transferred from the WDM network 1 to the WDM network 2, wavelength components unnecessary to the WDM network 2 can sufficiently be removed from that WDM optical signal. Thus, also in the second embodiment, crosstalk in the WDM network 2 is suppressed, and the transmission quality of optical signals is enhanced.

When the WDM network 1 is to be newly connected to the existing WDM network 2 in the second embodiment, the WDM network 2, for example, halts temporarily. Then an operator, who operates or manages the network, replaces the node device for 100 GHz-spaced WDM signal at a node on the WDM network 2 to be connected to the WDM network 1 with a node device for 50 GHz-spaced WDM signal (node device 25 in the example in FIG. 9). Thereby, the optical network interconnect device 50 is implemented. Alternatively, the WDM network 2 may be designed in advance to have a node device for 50 GHz-spaced WDM signal at a node to be connected to the WDM network 1.

Third Embodiment

Figure 11:
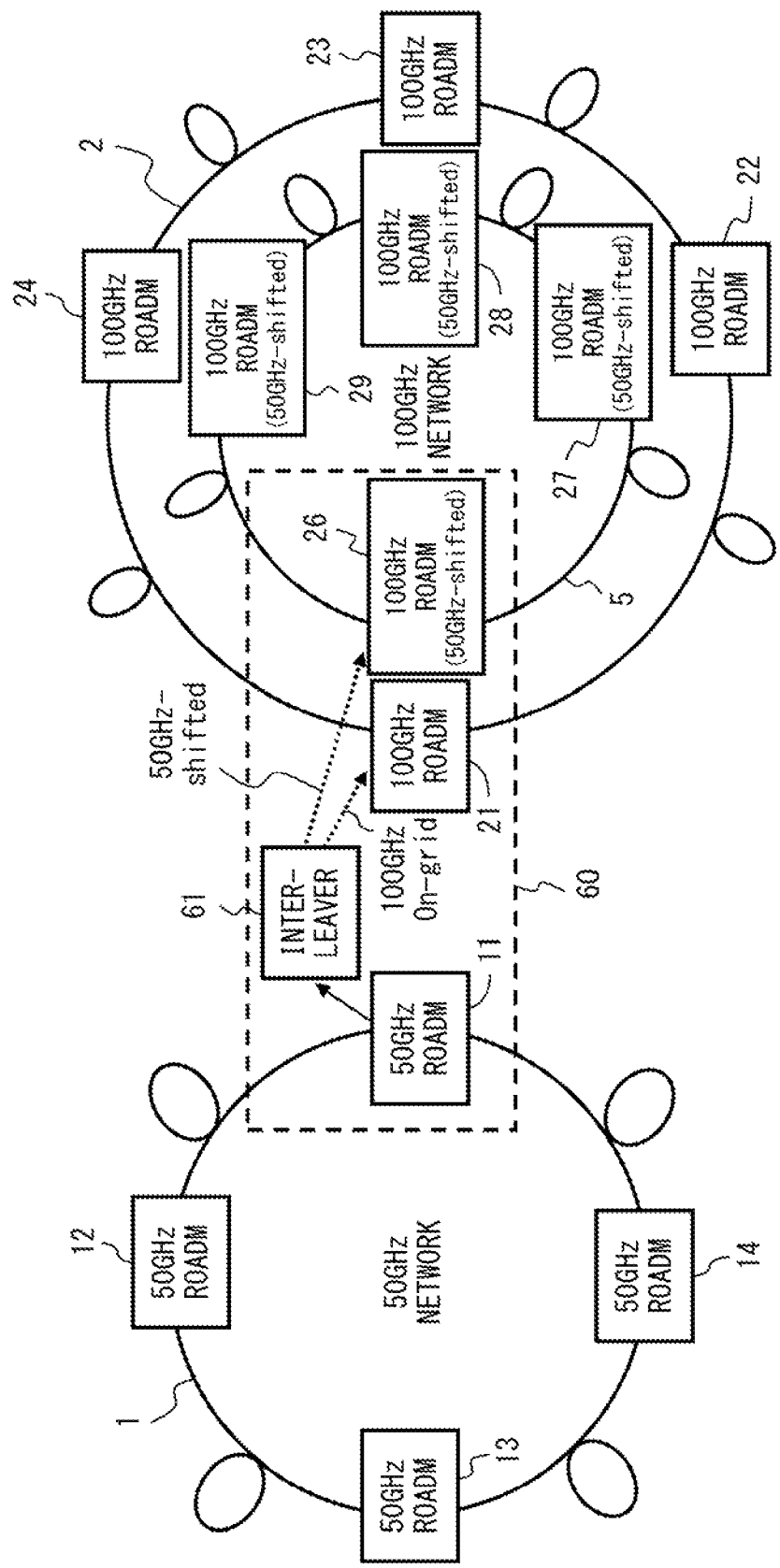
FIG. 11 illustrates a configuration of a network that uses an optical network interconnect device according to a third embodiment.

FIG. 11 illustrates a configuration of a network that uses an optical network interconnect device according to a third embodiment. An optical network interconnect device 60 according to the third embodiment relays optical signals among WDM networks 1, 2 and 5. The WDM networks 1 and 2 and the node devices 11-14 and 21-24 are as explained by referring to FIG. 3.

Similarly to the WDM network 2, the WDM network 5 transmits 100 GHz-spaced WDM optical signal. In the WDM network 2, respective optical signals are allocated on ITU-T 100 GHz grid. By contrast, in the WDM network 5, respective optical signals are allocated on a wavelength grid shifted by 50 GHz from the ITU-T 100 GHz grid.

The WDM network 5 includes node devices 26 through 29 connected by optical fibers to form a ring. Each of the node devices 26 through 29 is a reconfigurable optical add drop multiplexer that processes 100 GHz-spaced WDM optical signal. However, each of the node devices 26 through 29 processes WDM optical signals on a wavelength grid shifted by 50 GHz from the ITU-T 100 GHz grid.

In addition, each node device (reconfigurable optical add drop multiplexer in this example) includes, for example, a liquid crystal-based wavelength selective switch. In such a case, by adjusting a control signal for a wavelength selective switch based on ITU-T 100 GHz grid, a wavelength selective switch for 50 GHz-shifted grids can be realized. The wavelength selective switch included in each node device may also be implemented by use of MEMS (Micro Electro Mechanical Systems). In such a case, the MEMS is designed taking into consideration 50 GHz-shifted wavelength grid in advance.

The optical network interconnect device 60 includes the node devices 11, 21, and 26 respectively belonging to the WDM networks 1, 2, and 5, and an interleaver 61. The interleaver 61 generates a pair of deinterleaved WDM optical signals from an internetwork WDM optical signal branched from the WDM network 1. The spacing of each of the pair of deinterleaved WDM optical signals is 100 GHz. One of those deinterleaved WDM optical signals is allocated on the ITU-T 100 GHz grid. Accordingly, hereinafter, this WDM optical signal may also be referred to as an on-grid WDM optical signal. Also, the other one of those deinterleaved WDM optical signals is allocated on a wavelength grid shifted by 50 GHz from the ITU-T 100 GHz grid. Accordingly, hereinafter, this WDM optical signal may also be referred to as a 50 GHz-shifted WDM optical signal.

The optical network interconnect device 60 guides the on-grid WDM optical signal generated by the interleaver 61 to the node device 21 belonging to the WDM network 2. Also, the optical network interconnect device 60 guides the 50 GHz-shifted WDM optical signal generated by the interleaver 61 to the node device 26 belonging to the WDM network 5.

Figure 12:
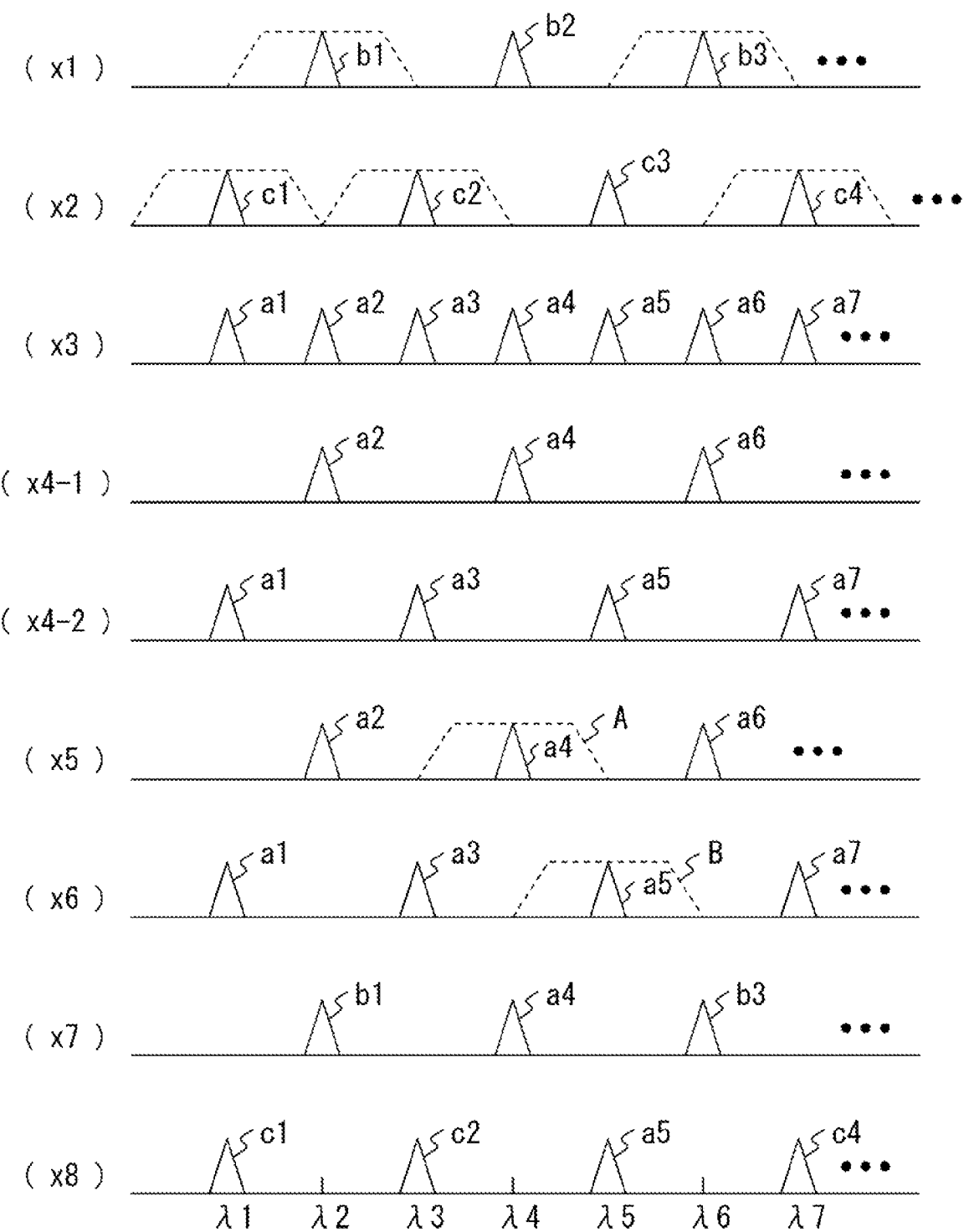
FIG. 12 explains operations of the optical network interconnect device according to the third embodiment.

FIG. 12 explains operations of the optical network interconnect device 60 according to the third embodiment. In this example, a WDM optical signal of the WDM network 2 contains optical signals b1 through b3 as indicated by (x1). The wavelengths of optical signals b1, b2, and b3 are $\lambda 2$, $\lambda 4$, and $\lambda 6$, respectively. The WDM network 2 transmits optical signals on the ITU-T 100 GHz grid. In other words, $\lambda 2$, $\lambda 4$, and $\lambda 6$ are wavelengths on ITU-T 100 GHz grid. A WDM optical signal of the WDM network 5 contains optical signals c1 through c4 as indicated by (x2). The wavelengths of optical signals c1, c2, c3, and c4 are $\lambda 1$, $\lambda 3$, $\lambda 5$, and $\lambda 7$, respectively. The WDM network transmits optical signals on the wavelength grid shifted by 50 GHz with respect to the 100 GHz grid. In other words, $\lambda 1$, $\lambda 3$, $\lambda 5$, and $\lambda 7$ are allocated on 50 GHz-shifted grid.

A WDM optical signal of the WDM network 1 contains optical signals a1 through a7 as indicated by (x3). The optical network interconnect device 60 adds optical signal a4 to the WDM optical signal of the WDM network 2, and adds optical signal a5 to the WDM optical signal of the WDM network 5.

In this case, the node device 21 removes optical signal b2 in order to add optical signal a4 having wavelength $\lambda 4$ to the WDM optical signal of the WDM network 2 as indicated by (x1). Also, the node device 26 removes optical signal c3 in order to add optical signal a5 having wavelength $\lambda 5$ to the WDM optical signal of the WDM network 5.

The interleaver 61 separates optical signals a1 through a7 indicated by (x3) into optical signals a2, a4, and a6 indicated by (x4-1) and optical signals a1, a3, a5, and a7 indicated by (x4-2). In other words, the interleaver 61 separates optical signals a1 through a7 into even-numbered channel optical signals and odd-numbered channel optical signals. Optical signals a2, a4, and a6 are allocated on the ITU-T 100 GHz grid. Optical signals a1, a3, a5, and a7 are allocated on the 50 GHz-shifted grid. The optical network interconnect device 60 guides optical signals a2, a4, and a6 on the ITU-T 100 GHz grid to the node device 21, and guides optical signals a1, a3, a5, and a7 on the 50 GHz-shifted grid to the node device 26.

The wavelength selective switch of the node device 21 provides transmission band A in order to select optical signal a4 as indicated by (x5). Thereby, optical signals a2 and a6 are removed in the node device 21. As a result, as indicated by (x7), the node device 21 outputs a WDM optical signal containing optical signals b1 and b3 selected from the WDM optical signal of the WDM network 2 and optical signal a4 selected from the WDM optical signal of the WDM network 1.

The wavelength selective switch of the node device 26 provides transmission band B in order to select optical signal a5 as indicated by (x6). Thereby, optical signals a1, a3, and a7 are removed in the node device 26. As a result, as indicated by (x8), the node device 26 outputs a WDM optical signal containing optical signals c1, c2, and c4 selected from the WDM optical signal of the WDM network 5 and optical signal a5 selected from the WDM optical signal of the WDM network 1.

As described above, in the third embodiment, the interleaver 61 generates a plurality of deinterleaved WDM optical signals (on-grid WDM optical signal and 50 GHz-shifted WDM optical signal) from the internetwork WDM optical signal. Each of such deinterleaved WDM optical signals is guided to corresponding WDM network having different wavelength grid.

Fourth Embodiment

Figure 13:
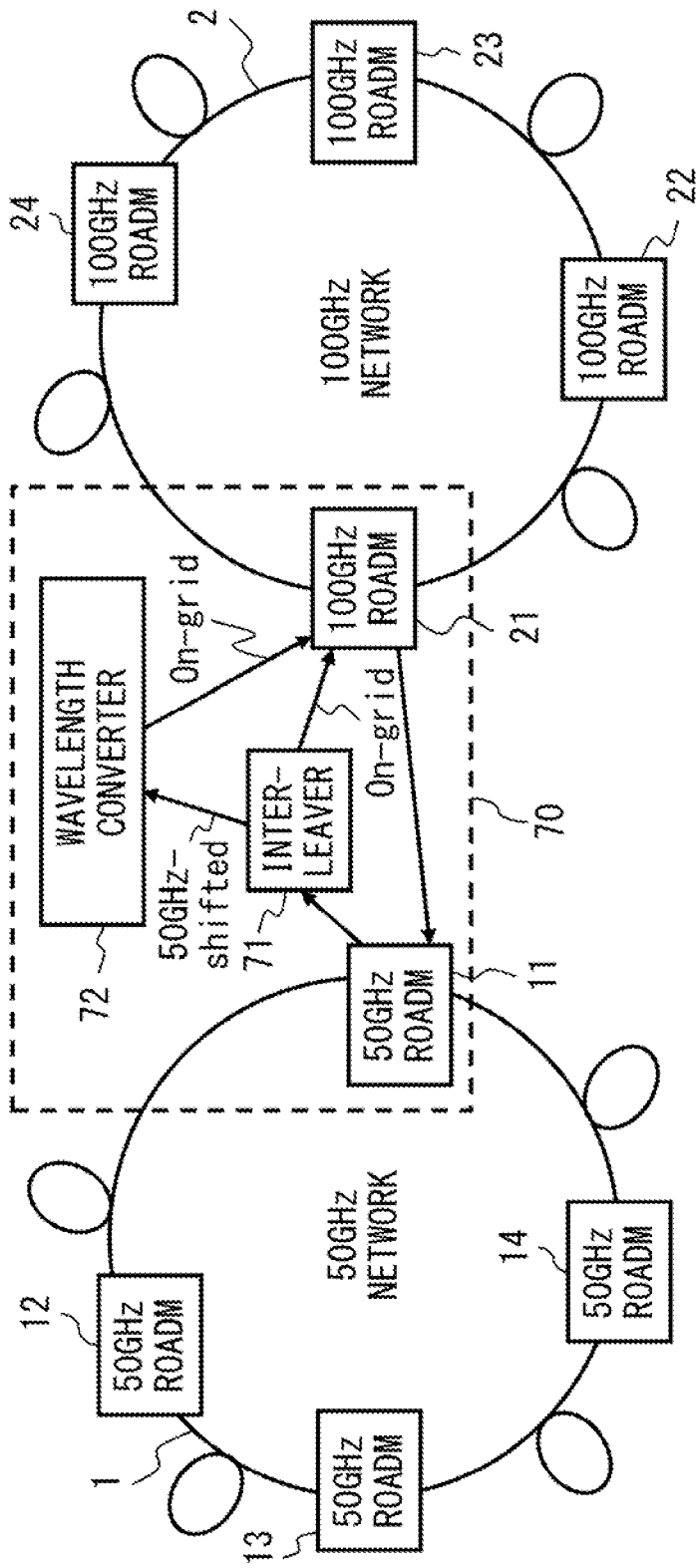
FIG. 13 illustrates a configuration of a network that uses an optical network interconnect device according to a fourth embodiment.

FIG. 13 illustrates a configuration of a network that uses an optical network interconnect device according to a fourth embodiment. An optical network interconnect device 70 according to the fourth embodiment relays optical signals between the WDM networks 1 and 2. The WDM networks 1 and 2 and the WDM networks 11-14 and 21-24 are as described by referring to FIG. 3.

The optical network interconnect device 70 includes the node devices 11 and 21 belonging to the WDM networks 1 and 2, respectively, an interleaver 71, and a wavelength converter 72. The interleaver 71, similarly to the interleaver 61 illustrated in FIG. 11, generates a pair of deinterleaved WDM optical signals from an internetwork WDM optical signal branched from the WDM network 1. Specifically, the interleaver generates the on-grid WDM optical signal and the 50 GHz-shifted WDM optical signal. The optical network interconnect device 70 guides the on-grid WDM optical signal to the node device 21, and guides the 50 GHz-shifted WDM optical signal to the wavelength converter 72.

The wavelength converter 72 shifts the wavelength of each optical signal contained in the 50 GHz-shifted WDM optical signal by 50 GHz. In other words, the wavelength converter 72 generates another on-grid WDM optical signal from the 50 GHz-shifted WDM optical signal. In addition, the optical network interconnect device 70 guides the on-grid WDM optical signal obtained by the wavelength converter 72 to the node device 21.

The node device 21 selects optical signals having desired wavelengths respectively from the input WDM optical signal of the WDM network 2, the on-grid WDM optical signal generated by the interleaver 71, and the on-grid WDM optical signal generated by the wavelength converter 72. Thereby, one or more optical signals of the WDM network 1 is added to the WDM optical signal of the WDM network 2.

Figure 14:
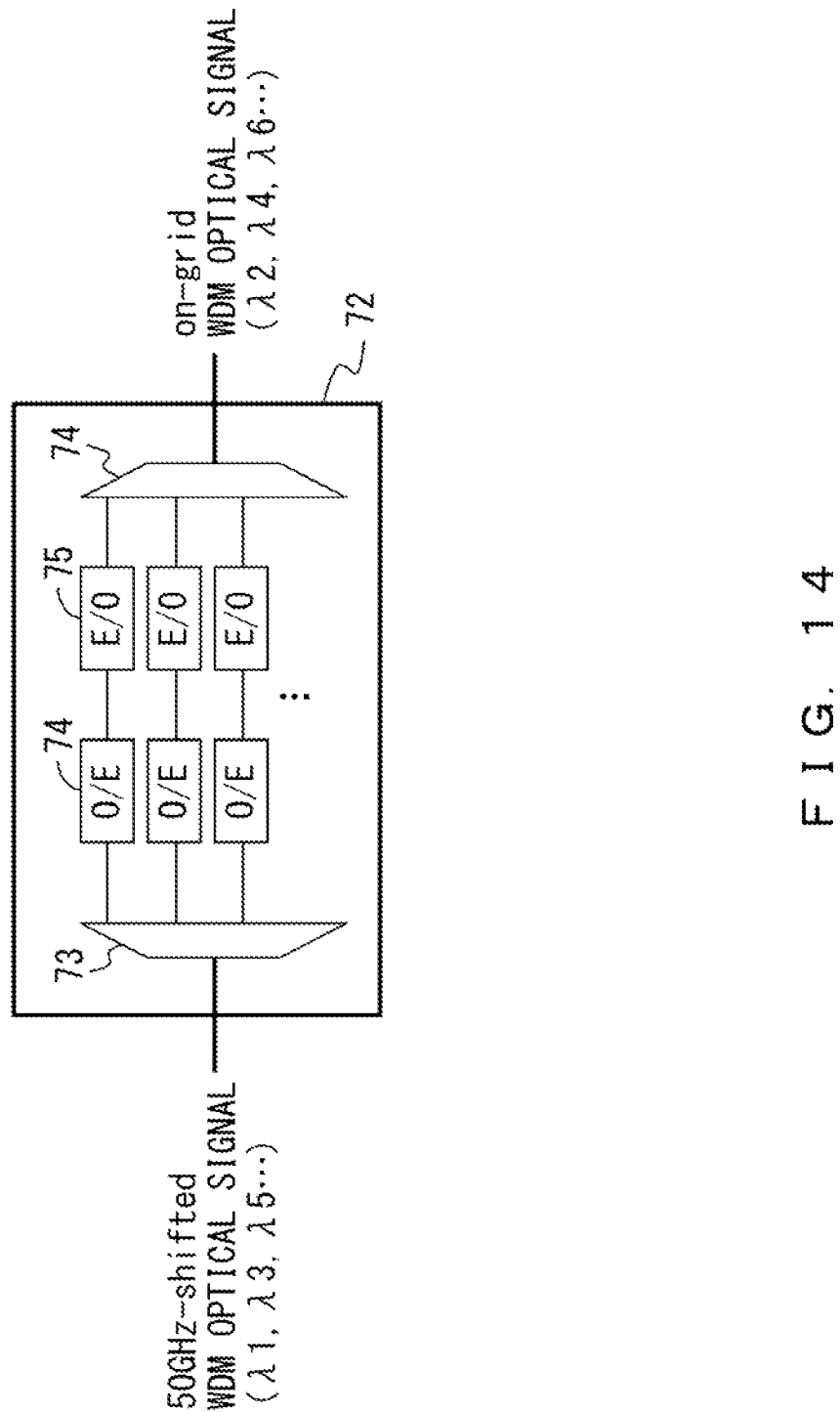
FIG. 14 illustrates an example of a wavelength converter in the fourth embodiment.

FIG. 14 illustrates an example of the wavelength converter 72. The wavelength converter 72 includes an optical demultiplexer 73, a plurality of O/E converters 74, a plurality of E/O converters 75, and an optical multiplexer 76. The optical demultiplexer 73 separates the 50 GHz-shifted WDM optical signal generated by the interleaver 71 with respect to wavelength. The O/E converters 74 convert optical signals obtained by the optical demultiplexer 73 into electric signals, respectively. The E/O converters 75 convert the electric signals obtained by corresponding O/E converters 74 into optical signals, respectively. The E/O converters 75 output optical signals with corresponding wavelengths on the ITU-T 100 GHz grid. The optical multiplexer 76 multiplexes the plurality of optical signals generated by the E/O converters 75.

As described above, the wavelength converter 72 illustrated in FIG. 14 is a wavelength-converting regenerator to perform O/E/O conversion. However, in the optical network interconnect device 70 according to the fourth embodiment, the wavelength converter 72 does not convert all optical signals contained in the WDM optical signal of the WDM network 1, but converts only respective optical signals in the 50 GHz-shifted WDM optical signal. Accordingly, the wavelength converter 72 has about half as many O/E converters and E/O converters as those included in a configuration that converts all optical signals contained in the WDM optical signal of the WDM network 1. Therefore, the wavelength converter 72 is reduced in size and cost. In addition, the wavelength converter 72 may employ a configuration of converting the wavelength of each optical signal in optical domain.

Figure 15:
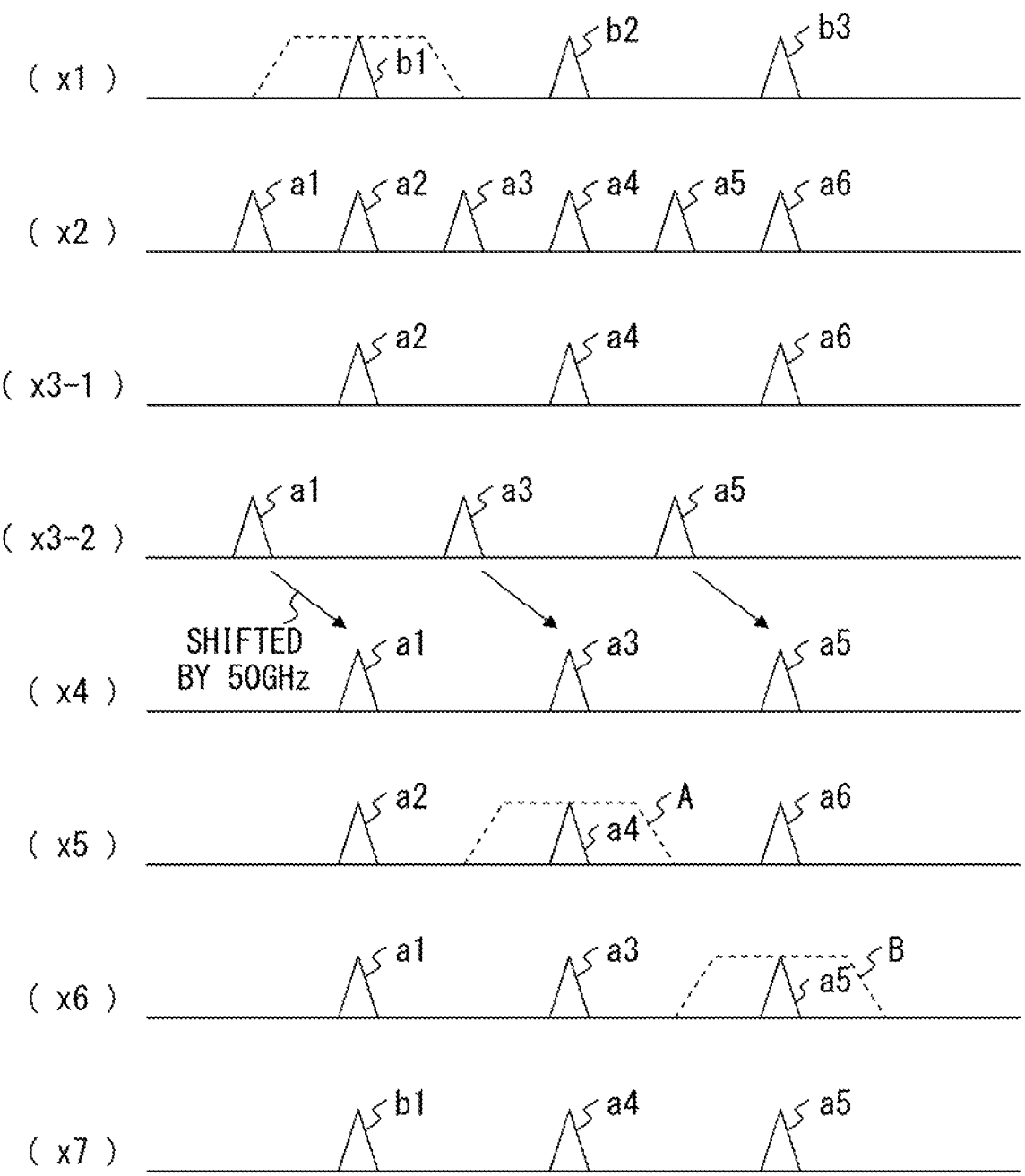
FIG. 15 explains operations of the optical network interconnect device according to the fourth embodiment.

FIG. 15 illustrates operations of the optical network interconnect device 70 according to the fourth embodiment. As indicated by (x1), the WDM optical signal of the WDM network 2 contains optical signals b1 through b3. The wavelengths of optical signals b1, b2, and b3 are wavelengths $\lambda 2$, $\lambda 4$, and $\lambda 6$ on the 100 GHz grid. The WDM optical signal of the WDM network 1 contains optical signals a1 through a6 as indicated by (x2). The optical network interconnect device 70 adds optical signals a4 and a5 to the WDM optical signal of the WDM network 2. In such a case, the wavelength selective switch 43b of the node device 21 removes optical signals b2 and b3 in order to add optical signals a4 and a5 to the WDM optical signal of the WDM network 2 as indicated by (x1).

The interleaver 71 separates optical signals a1 through a6 into optical signals a2, a4, and a6 indicated by (x3-1) and optical signals a1, a3, and a5 indicated by (x3-2). Optical signals a2, a4, and a6 are allocated on the ITU-T 100 GHz grid. Optical signals a1, a3, and a5 are allocated on the 50 GHz-shifted grid. The optical network interconnect device 70 guides optical signals a2, a4, and a6 on the 100 GHz grid to the node device 21, and guides optical signals a1, a3, and a5 on the 50 GHz-shifted grid to the wavelength converter 72.

The wavelength converter 72 shifts the wavelengths of optical signals a1, a3, and a5 by 50 GHz, respectively. Thereby, the wavelengths of optical signals a1, a3, and a5 are shifted to $\lambda 2$, $\lambda 4$, and $\lambda 6$, respectively as indicated by (x4). In other words, optical signals a1, a3, and a5 are allocated on the 100 GHz grid.

As indicated by (x5), the wavelength selective switch 43b of the node device 21 provides transmission band A in order to select optical signal a4 from the on-grid WDM optical signal (a2, a4, a6) generated by the interleaver 71. Thereby, optical signals a2 and a6 are removed. Also, as indicated by (x6), the wavelength selective switch 43b of the node device 21 provides transmission band B in order to select optical signal a5 from the on-grid WDM optical signal (a1, a3, a5) generated by the wavelength converter 72. Thereby, optical signals a1 and a3 are removed. Thereafter, the node device 21 outputs a WDM optical signal containing optical signals b1, a4, and a5.

As described above, according to the fourth embodiment, the optical network interconnect device 70 can add a desired optical signal to a destination WDM network by performing appropriate wavelength conversion even when the desired optical signal is not allocated on a wavelength grid of the destination WDM network. Also, neither the size nor the cost of the optical network interconnect device 70 is increased greatly even in a case where the optical network interconnect device 70 performs O/E/O conversion for wavelength conversion.

Fifth Embodiment

FIG. 16 illustrates a configuration of an optical network interconnect device according to a fifth embodiment. An optical network interconnect device 80 according to the fifth embodiment relays optical signals between the above described WDM networks 1 and 2. The WDM networks 1 and 2, the node devices 11-14 and 21-24 are as explained by referring to FIG. 3.

The optical network interconnect device 80 includes the node devices 11 and 21 belonging to the WDM networks 1 and 2, respectively, and a wavelength converter 81. The node devices 11 and 21 are as described above. The optical network interconnect device 80 guides an internetwork WDM optical signal branched from the WDM network 1 to the wavelength converter 81.

The wavelength converter 81 includes an optical demultiplexer 82, a plurality of wavelength conversion elements 83, a plurality of optical switches 84, and an optical multiplexer 85. The optical demultiplexer 82 separates the internetwork WDM optical signal branched from the WDM network 1 with respect to wavelength. The optical demultiplexer 82 includes a plurality of output ports P1, P2, P3, P4, . . . . The optical demultiplexer 82 outputs, through output ports P1, P2, P3, P4 . . . , optical signals separated from the internetwork WDM optical signal, in the order starting from the optical signal having the shortest wavelength. Note that the optical demultiplexer 82 is an example of a wavelength demultiplexer.

Optical signals output via odd-numbered output ports P1, P3, . . . of the optical demultiplexer 82 are guided to the wavelength conversion elements 83, respectively. Each of the wavelength conversion elements 83 shifts the wavelength of an input optical signal by 50 GHz. The wavelength conversion element 83 may be configured to perform O/E/O conversion, or may be configured to convert wavelengths in optical domain. Optical signals output from the wavelength conversion elements 83 are guided to the first input ports of corresponding optical switches 84. Optical signals output via even-numbered output ports P2, P4, . . . of the optical demultiplexer 82 are guided to the second input ports of corresponding optical switches 84.

The optical switches 84 selects an optical signal input from a first input port or a second input port based on, for example, instructions given by an operator who operates or manages the network. The optical multiplexer 85 multiplexes optical signals selected by the respective optical switches 84. The optical network interconnect device 80 guides a WDM optical signal obtained by the optical multiplexer 85 to the node device 21. The node device 21 adds the optical signal of the WDM network 1 to the WDM optical signal of the WDM network 2.

FIG. 17 explains operations of the optical network interconnect device 80 according to the fifth embodiment. In the fifth embodiment, a WDM optical signal containing optical signals a1 through a6 indicated by (x2) is separated for each wavelength by the optical demultiplexer 82 as indicated by (x3-1) through (x3-6). Optical signals a2, a4, and a6 are allocated on the 100 GHz grid. The optical signals a1, a3, and a5 are allocated on the wavelength grid shifted by 50 GHz with respect to the 100 GHz grid. Accordingly, the wavelength conversion elements 83 shift the wavelengths of optical signals a1, a3, and a5 by 50 GHz, respectively, in order to allocate optical signals a1, a3, and a5 on the 100 GHz grid. As a result, as indicated by (x4-1) through (x4-6), the wavelengths of optical signals a1, a3, and a5 are converted into $\lambda 2$, $\lambda 4$, and $\lambda 6$, respectively.

Each of the optical switches 84 selects designated one of two input optical signals. In this example, optical signal a1 is selected from among optical signals a1 and a2, optical signal a4 is selected from among optical signals a3 and a4, and optical signal a5 is selected from among optical signals a5 and a6. The optical multiplexer 85 multiplexes optical signals a1, a4, and a5 selected by the respective optical switches 84, and transmits the multiplexed signal to the node device 21.

The wavelength selective switch 43b of the node device 21 provides, as indicated by (x5), transmission bands A and B in order to select optical signals a4 and a5 from the WDM optical signal (a1, a4, a5) generated by the optical multiplexer 85. Thereby, optical signal a1 is removed. The node device 21 outputs a WDM optical signal containing optical signals b1, a4, a5.

As described above, also according to the fifth embodiment, the optical network interconnect device 80 is capable of adding a desired optical signal to a destination WDM network, even when the desired optical signal is not allocated on a wavelength grid of the destination WDM network. Note that the node device 21 uses two input ports in order to receive an internetwork WDM optical signal from the WDM network 1 according to the fourth embodiment. On the other hand, the node device 21 according to the fifth embodiment is capable of receiving the internetwork WDM optical signal from the WDM network 1 with one input port.

Sixth Embodiment

FIG. 18 illustrates a configuration of an optical network interconnect device according to a sixth embodiment. An optical network interconnect device 90 according to the sixth embodiment relays optical signals between the above described WDM networks 1 and 2. The WDM networks 1 and 2, the node devices 11-14 and 21-24 are as explained by referring to FIG. 3.

The optical network interconnect device 90 includes the node devices 11 and 21 belonging to the WDM networks 1 and 2, respectively, and a wavelength converter 91. The node devices 11 and 21 are as described before. The optical network interconnect device 90 guides an internetwork WDM optical signal branched from the WDM network 1 to the wavelength converter 91.

The wavelength converter 91 includes an optical demultiplexer 92, a plurality of wavelength conversion elements 93, and optical multiplexers 94a and 94b. Operations of the optical demultiplexer 92 and the wavelength conversion elements 93 are similar to those of the optical demultiplexer 82 and the wavelength conversion elements 83 illustrated in FIG. 16, respectively. That is, the optical demultiplexer 92 separates an internetwork WDM optical signal for each wavelength. The wavelength conversion elements 93 shift the wavelengths of the respective optical signals allocated on the 50 GHz-shifted grid by 50 GHz. Note that the optical demultiplexer 92 is an example of a wavelength demultiplexer.

The optical multiplexer 94a multiplexes optical signals output from the respective wavelength conversion elements 93. The optical multiplexer 94b multiplexes respective optical signals on the 100 GHz grid output from the optical demultiplexer 92.

The wavelength selective switch 43b of the node device 21 selects desired wavelengths from an input WDM optical signal of the WDM network 2, a WDM optical signal obtained by the optical multiplexer 94a, and a WDM optical signal obtained by the optical multiplexer 94b. By so doing, the node device 21 adds an optical signal of the WDM network 1 to the WDM optical signal of the WDM network 2.

Figure 19:
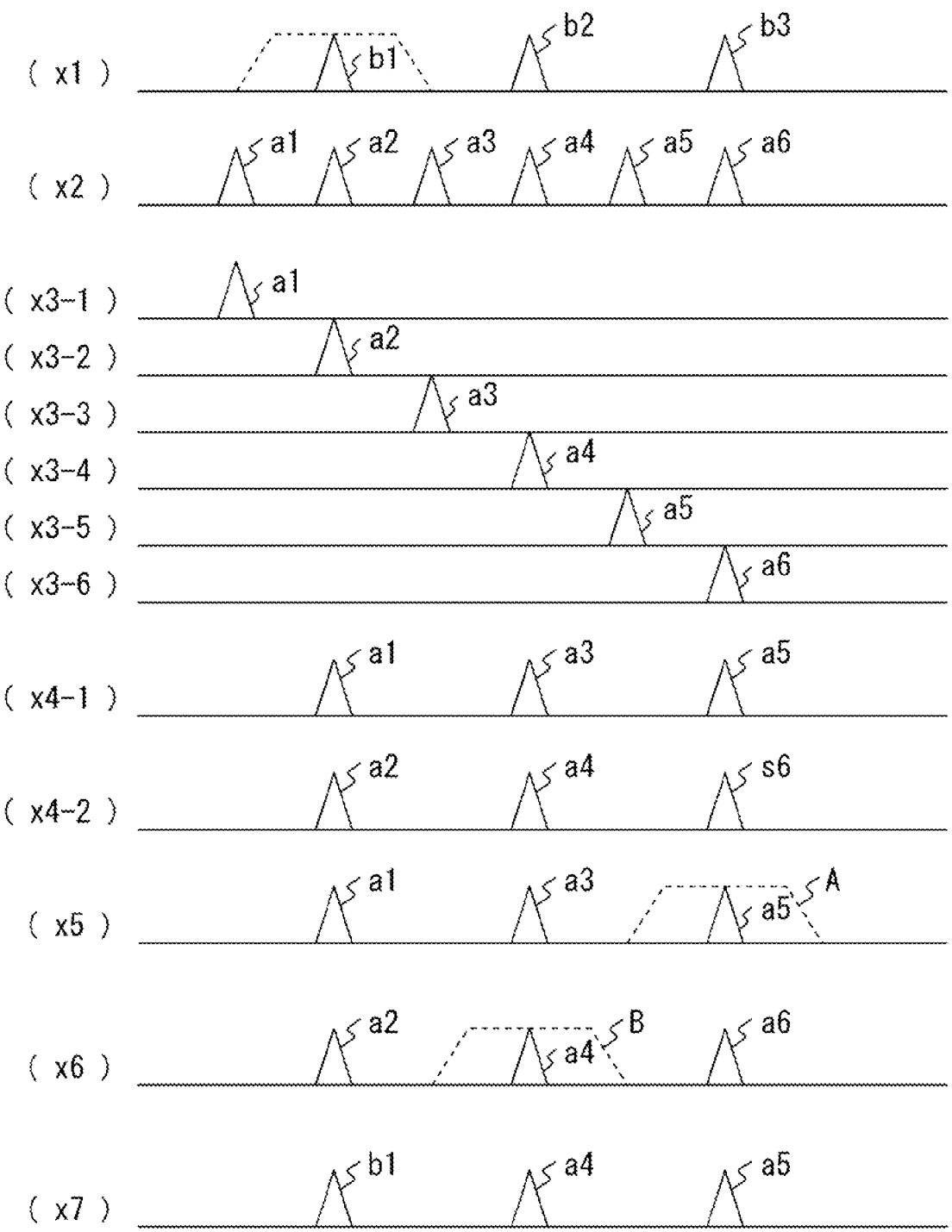
FIG. 19 explains operations of the optical network interconnect device according to the sixth embodiment.

FIG. 19 explains operations of the optical network interconnect device 90 according to the sixth embodiment. Also in the sixth embodiment, the internetwork WDM optical signal indicated by (x2) is separated by the optical demultiplexer 92 for each wavelength as indicated by (x3-1) through (x3-6). Optical signals a2, a4, and a6 are allocated on the 100 GHz grid. The optical signals a1, a3, and a5 are allocated on a wavelength grid shifted by 50 GHz with respect to the 100 GHz grid, respectively. Thus, the wavelength conversion elements 93 shift the wavelengths of optical signals a1, a3, and a5 by 50 GHz, respectively, in order to allocate optical signals a1, a3, and a5 on the 100 GHz grid. As a result, as indicated by (x4-1), the wavelengths of optical signals a1, a3, and a5 are converted into $\lambda 2$, $\lambda 4$, and $\lambda 6$, respectively.

The optical multiplexer 94a multiplexes optical signals a1, a3, and a5 indicated by (x4-1), and transmits the resultant signal to the wavelength selective switch 43b. The optical multiplexer 94b multiplexes optical signals a2, a4, and a6 indicated by (x4-2), and transmits the resultant signal to the wavelength selective switch 43b.

As indicated by (x5), the wavelength selective switch 43b of the node device 21 provides transmission band A in order to select optical signal a5 from the WDM optical signal (a1, a3, a5) generated by the optical multiplexer 94a. Thereby, optical signals a1 and a3 are removed. Also, as indicated by (x6), the wavelength selective switch 43b provides transmission band B in order to select optical signal a4 from the WDM optical signal (a2, a4, a6) generated by the optical multiplexer 94b. Thereby, optical signals a2 and a6 are removed. Thereafter, the node device 21 generates and outputs a WDM optical signal containing optical signals b1, a4, and a5.

As described above, the selecting function provided by the optical switches 84 in the fifth embodiment is realized by a wavelength selective switch included in a node device. Accordingly, the optical network interconnect device according to the sixth embodiment is capable of providing the operations equivalent to those provided by the fifth embodiment without requiring the plurality of optical switches 84.

\<Others\>

Although a node device is implemented by a reconfigurable optical add drop multiplexer (ROADM) including a wavelength selective switch in the above explanations, the node device may be implemented by other configurations. Specifically, the node device may be, for example, an optical add drop multiplexer including a wavelength blocker.

Also, the wavelength spacing of one WDM network is twice as that of the other WDM network in the first through sixth embodiments. However, an optical network interconnect device according to the invention is not limited to this condition. Specifically, an optical network interconnect device according to the invention may interconnect, for example, a 100 GHz-spaced WDM network and a 25 GHz-spaced WDM network.

In the explanations for the first through sixth embodiments, operations have been explained on the assumption that an optical network interconnect device includes node devices for a WDM network. However, at least in the first and the third through sixth embodiments, a node device of a WDM network does not have to be an element for the optical network interconnect device. In other words, in the first embodiment illustrated in FIG. 3 for example, an optical network interconnect device may be an optical circuit including the cyclic filter 31 provided between the node devices 11 and 21. Alternatively, when, for example, the WDM network 2 has already been constructed, and the WDM network 1 is to be newly constructed to be connected to the WDM network 2 in FIG. 3, an optical network interconnect device may be an optical circuit including the node device 11 (or part of the node device 11) and the cyclic filter 31.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present inventions has(have) been described in detail, it should be understood that the various changes, substitutions, and alterations could be made hereto without departing from the spirit and scope of the invention.

What is claimed is:

1. An optical network interconnect device that interconnects a first WDM network for transmitting a WDM optical signal with first wavelength spacing and a second WDM network for transmitting a WDM optical signal with second wavelength spacing that is wider than the first wavelength spacing, the optical network interconnect device comprising:
    an optical branch device configured to branch the WDM optical signal of the first WDM network; and
    an optical filter configured to remove a wavelength component which is not used in the second WDM network from the branched WDM optical signal transferred from the first WDM network to the second WDM network, wherein
    the second wavelength spacing is twice the first wavelength spacing,
    the optical network interconnect device interconnects a third WDM network for transmitting a WDM optical signal with the second wavelength spacing,
    the optical filter is an interleaver to generate a pair of deinterleaved WDM optical signals from the branched WDM optical signal,
    one of the pair of deinterleaved WDM optical signals is transferred to the second WDM network, and
    the other of the pair of deinterleaved WDM optical signals is transferred to the third WDM network.

2. The optical network interconnect device according to claim 1, further comprising
    a switch configured to add an add optical signal to the branched WDM optical signal from which a wavelength component has been removed by the optical filter.

3. The optical network interconnect device according to claim 1, wherein
    a transmission rate of an optical signal transmitted through the first WDM network is the same as a transmission rate of an optical signal transmitted through the second WDM network.

4. The optical network interconnect device according to claim 1, wherein
    the optical filter has a plurality of transmission bands, and a bandwidth of each of the plurality of transmission bands is narrower than the first wavelength spacing.

5. An optical network interconnect device that interconnects a first WDM network for transmitting a WDM optical signal with first wavelength spacing and a second WDM network for transmitting a WDM optical signal with second wavelength spacing that is wider than the first wavelength spacing, the optical network interconnect device comprising:
    an optical branch device configured to branch a WDM optical signal of the first WDM network to generate an internetwork WDM optical signal;
    an interleaver configured to generate a first deinterleaved WDM optical signal that is not allocated on a wavelength grid of the second WDM network and a second deinterleaved WDM optical signal that is allocated on a wavelength grid of the second WDM network from the internetwork WDM optical signal, each of the first and second deinterleaved WDM optical signals having the second wavelength spacing;
    a wavelength converter configured to convert a wavelength of a first optical signal that is contained in the first deinterleaved WDM optical signal so that the converted wavelength of the first optical signal is allocated on a wavelength grid of the second WDM network and so that the converted wavelength of the first optical signal is the same as a wavelength of a second optical signal that is contained in the second deinterleaved WDM optical signal; and
    an optical switch configured to select one of the first optical signal and the second optical signal.

6. The optical network interconnect device according to claim 5, wherein
    the second wavelength spacing is twice the first wavelength spacing,
    the wavelength converter shifts a wavelength of an optical signal that is contained in the first deinterleaved WDM optical signal by an amount equivalent to the first wavelength spacing.

7. An optical network interconnect device that interconnects a first WDM network for transmitting a WDM optical signal with first wavelength spacing and a second WDM network for transmitting a WDM optical signal with second wavelength spacing that is wider than the first wavelength spacing, the optical network interconnect device comprising:
    an optical branch device configured to branch a WDM optical signal of the first WDM network to generate an internetwork WDM optical signal;
    a wavelength demultipexer configured to demultiplex the internetwork WDM optical signal with respect to wavelength to generate a plurality of optical signals;

a wavelength converter configured to convert a wavelength of a first optical signal that is included in the plurality of optical signals so that the converted wavelength of the first optical signal is allocated on a wavelength grid of the second WDM network and so that the converted wavelength of the first optical signal is the same as a wavelength of a second optical signal that is included in the plurality of optical signals; and an optical switch configured to select one of the first optical signal and the second optical signal.

* * * * *